(12) United States Patent
Kumanomido et al.

(10) Patent No.: US 8,406,368 B2
(45) Date of Patent: Mar. 26, 2013

(54) BURN-UP PROFILE MEASURING METHOD, BURN-UP PROFILE MEASURING APPARATUS, RADIATION SIGNAL DISTRIBUTION MEASURING APPARATUS, AND BURN-UP PROFILE MEASURING PROGRAM

(75) Inventors: Hironori Kumanomido, Tokyo (JP); Naotaka Oda, Tokyo (JP); Yutaka Tokiwa, Tokyo (JP); Makoto Ueda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 750 days.

(21) Appl. No.: 12/595,546

(22) PCT Filed: Apr. 11, 2008

(86) PCT No.: PCT/JP2008/057203
§ 371 (c)(1),
(2), (4) Date: Oct. 12, 2009

(87) PCT Pub. No.: WO2008/129969
PCT Pub. Date: Oct. 30, 2008

(65) Prior Publication Data
US 2010/0065750 A1    Mar. 18, 2010

(30) Foreign Application Priority Data

Apr. 13, 2007   (JP) .................................. 2007-106332

(51) Int. Cl.
  *G21C 17/10* (2006.01)
  *G21C 17/108* (2006.01)
  *G21C 17/00* (2006.01)
(52) U.S. Cl. ........ 376/257; 376/245; 376/254; 376/255; 376/259

(58) Field of Classification Search .................. 376/257, 376/254, 255, 245, 259; 250/336.1, 390.01, 250/391, 252.1, 370.01, 370.05, 370.1
See application file for complete search history.

(56) References Cited

U.S. PATENT DOCUMENTS
4,335,466 A * 6/1982 Lee ............................... 376/257
(Continued)

FOREIGN PATENT DOCUMENTS
JP      1 92692     4/1989
JP      2 222884    9/1990
(Continued)

*Primary Examiner* — Bernarr Gregory
(74) *Attorney, Agent, or Firm* — Oblon, Spivak, McClelland, Maier & Neustadt, L.L.P.

(57) ABSTRACT

An upper detector and a lower detector that face at least one side of a fuel assembly, on which neutrons are irradiated in a nuclear reactor, and detect radiation are set at a predetermined interval in an axial direction of the fuel assembly. Distributions of radiation signals are measured by the upper detector and the lower detector while the fuel assembly and the upper detector and the lower detectors are relatively moved along the axial direction of the fuel assembly. Soundness of radiation signals measured by the upper detector and the lower detector is determined in every measurement by comparing radiation signal distributions obtained by measuring the same portion in the axial direction of the fuel assembly in a multiplexed manner with the upper detector and the lower detector. Thereafter, relative burn-up is calculated by utilizing the measured radiation signals to measure a burn-up profile. According to the present invention, it is possible to measure a burn-up profile of the fuel assembly while securing reliability of a measurement result.

17 Claims, 15 Drawing Sheets

U.S. PATENT DOCUMENTS

| | | | | |
|---|---|---|---|---|
| 4,347,622 A * | 8/1982 | Bernatowicz et al. | ......... | 376/245 |
| 4,578,237 A * | 3/1986 | Mordarski et al. | ............ | 376/257 |
| 4,588,547 A * | 5/1986 | Impink et al. | ................. | 376/254 |
| 5,969,359 A * | 10/1999 | Ruddy et al. | ............. | 250/370.05 |
| 6,035,010 A * | 3/2000 | George et al. | ................. | 376/257 |
| 6,596,998 B1 * | 7/2003 | Siedel | ......................... | 250/370.1 |
| 6,627,898 B2 * | 9/2003 | Seidel et al. | ............. | 250/390.01 |
| 6,664,539 B2 * | 12/2003 | Chesterman et al. | ...... | 250/252.1 |
| 7,756,237 B2 * | 7/2010 | Prasad et al. | .................. | 376/257 |
| 8,155,258 B2 * | 4/2012 | Rowland et al. | .............. | 376/245 |
| 8,180,013 B2 * | 5/2012 | Prasad et al. | ................... | 376/257 |
| 8,194,814 B2 * | 6/2012 | Rowland et al. | .............. | 376/257 |
| 2002/0195569 A1 * | 12/2002 | Seidel et al. | .................. | 250/391 |
| 2003/0085347 A1 * | 5/2003 | Chesterman et al. | ...... | 250/252.1 |

FOREIGN PATENT DOCUMENTS

JP   3 273192   12/1991

* cited by examiner

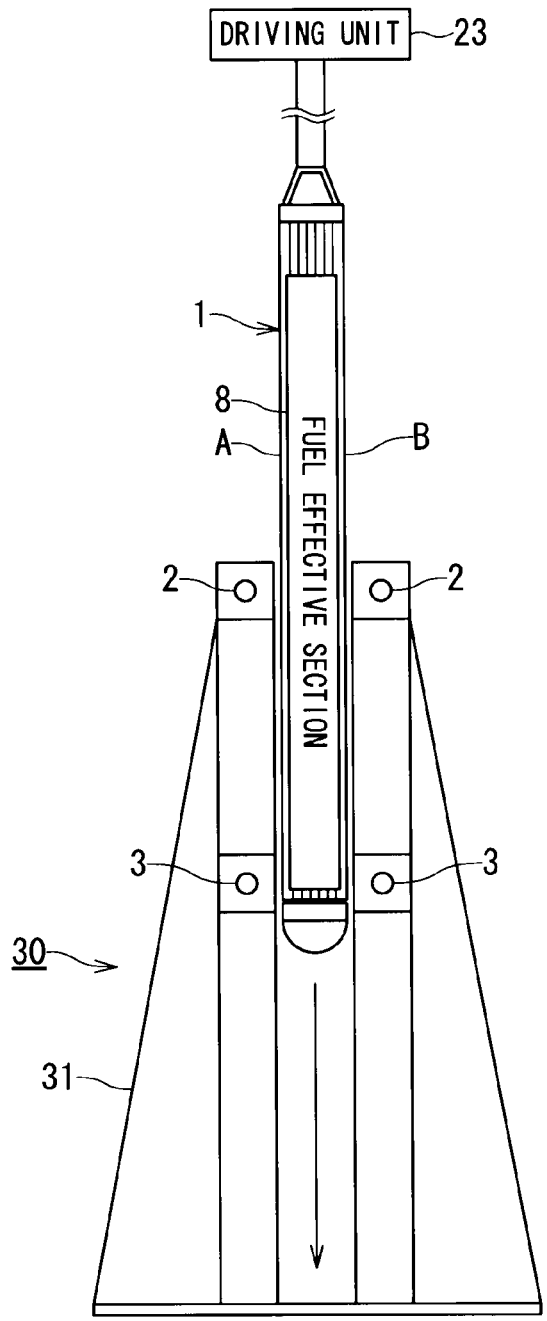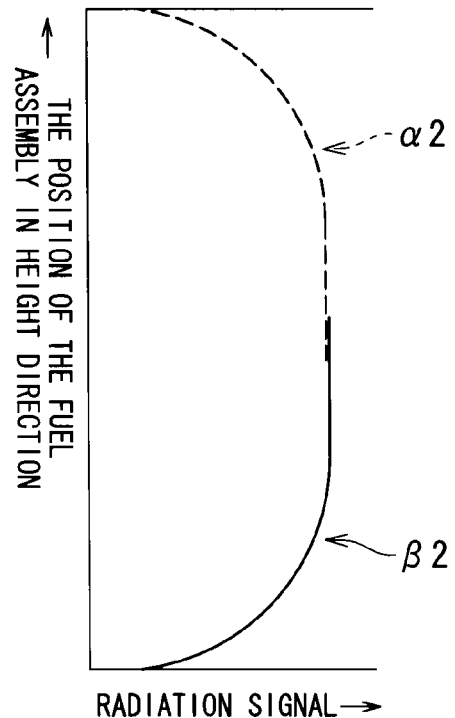
FIG. 6A
FIG. 6B

BURN-UP PROFILE MEASURING METHOD, BURN-UP PROFILE MEASURING APPARATUS, RADIATION SIGNAL DISTRIBUTION MEASURING APPARATUS, AND BURN-UP PROFILE MEASURING PROGRAM

TECHNICAL FIELD

The present invention relates to a specific burn-up relative distribution (burn-up profile) measuring method, a burn-up profile measuring apparatus, a radiation signal distribution measuring apparatus, and a burn-up profile measuring program for measuring a burn-up profile in an axial direction in a fuel assembly on which neutrons are irradiated in a nuclear reactor.

BACKGROUND ART

A specific burn-up measurement result of a fuel assembly, on which neutrons are irradiated in a nuclear reactor, can be utilized prior to the fuel assembly being loaded on a storage rack of a storage pool for storing and keeping the fuel assembly, a transportation cask or the like for transporting fuel, and the like or when criticality safety and shieldability are checked during fuel dissolution in a reprocessing plant for spent fuel. The specific burn-up measurement result can also be utilized for checking reliability of core management calculation for the nuclear reactor by performing comparison and collation with the core management calculation.

Further, the specific burn-up measurement result can also be utilized for inspection for confirming that the fuel assembly sufficiently burns and an amount of an incorporated nuclear fuel substance decreases. For the purpose of realizing such utilizes, in the past, development of specific burn-up measuring techniques for the fuel assembly has been actively performed in Japan and overseas.

In a fuel assembly for a nuclear reactor, in particular, a light-water reactor of a boiling water type or a pressurized water type, the length of a fuel effective section in which fuel is filled is equal to or larger than 3 m. Specific burn-up indicates a distribution high in the center and low at the upper and lower ends because of a neutron flux distribution in the nuclear reactor. Therefore, to accurately measure specific burn-up of the fuel assembly on which neutrons are irradiated, it is necessary to measure a specific burn-up distribution over the entire length of the fuel assembly. As a specific burn-up measuring technique developed in the past, as disclosed in Patent Documents 1 and 2, there is a method of arranging a large number of detectors for radiation measurement on a side of a fuel assembly and measuring a burn-up profile from signal distributions of the detectors. There is also a method of measuring a burn-up profile over the entire length in an axial direction in a fuel assembly while moving the fuel assembly up and down on a side of a detector (see, for example, Patent Document 3).

Patent Document 1: Japanese Patent Laid-Open No. 1-92692
Patent Document 2: Japanese Patent Laid-Open No. 2-222884
Patent Document 3: Japanese Patent Laid-Open No. 3-273192

DISCLOSURE OF THE INVENTION

The methods of measuring a burn-up profile in the past described above, i.e., the method of arranging a large number of detectors and measuring a burn-up profile at a time and the method of measuring a burn-up profile while moving a fuel assembly up and down can attain the purpose of burn-up profile measurement.

However, in the case in which the large number of detectors are utilized, when a part of the detectors output signals different from an original signal during the measurement because of a cause such as noise, a normal result cannot be obtained from a measured signal distribution. Further, when the sensitivity of a part of the detectors changes because of a cause such as deterioration, a normal result cannot be obtained either.

In the case in which a burn-up profile is measured while the fuel assembly is moved, when a measurement value becomes abnormal because of a cause such as noise during the measurement, a normal result cannot be obtained either. To move fuel, a motor or the like as a driving force for the fuel is operating. Since a circuit electrically having large load is present near the detectors, it is likely that the circuit becomes a noise source and adversely affects a measurement signal.

It is also conceivable that an abnormal measurement value such as noise can be excluded by sufficiently examining a measurement value. However, for example, in a process of work for sequentially loading spent fuel on a transportation cask, when a period for sufficiently examining a measurement result is not given, for example, when a fuel assembly is stored in the cask immediately after specific burn-up of the fuel assembly is measured, the unexpected abnormal signal described above may be overlooked.

In an apparatus which measures a burn-up profile utilizing a large number of detectors, although measurement time is reduced by utilizing the large number of detectors in the burn-up profile measuring apparatus, there are drawbacks such as a high failure rate and large cost for manufacturing and maintenance. On the other hand, in the method of measuring a burn-up profile while moving a fuel assembly, although the method is excellent in a failure rate and cost, there is a drawback in that long measurement time is required.

The present invention has been devised in view of the circumstances and it is an object of the present invention to provide a burn-up profile measuring method and a burn-up profile measuring program that can measure a burn-up profile of a fuel assembly while securing reliability of a measurement result.

It is another object of the present invention to provide a burn-up profile measuring method and a burn-up profile measuring program that can efficiently measure a burn-up profile of a fuel assembly while securing reliability of a measurement result.

The present invention provides, in a first aspect, a burn-up profile measuring method including: setting plural detectors, which detect radiation, in an axial direction of a fuel assembly at a predetermined interval to face at least one side of the fuel assembly on which neutrons are irradiated in a nuclear reactor; measuring distributions of radiation signals with the detectors while relatively moving the fuel assembly and the detectors along the axial direction of the fuel assembly; determining, in every measurement, soundness of radiation signals measured by the detectors by comparing radiation signal distributions obtained by measuring a same portion in the axial direction of the fuel assembly in a multiplexed manner with these plural detectors; and measuring a burn-up profile by calculating relative burn-up based on the measured radiation signals after the measured radiation signals soundness determination step.

Further, the present invention provides, in a second aspect, a burn-up profile measuring method including: setting plural detectors, which detect radiation, along an axial direction of a fuel assembly at an interval substantially equal to a distance obtained by dividing length of a fuel effective section of the fuel assembly by a number of the detectors to face at least one side of the fuel assembly on which neutrons are irradiated in a nuclear reactor; arranging, at a lower end of the fuel effective section, the detector in a bottom position and measuring distributions of radiation signals with the detectors while relatively moving the fuel assembly and the detectors along the axial direction of the fuel assembly in a distance longer than the detector interval; partially redundantly measuring a same portion of the fuel assembly with the detectors adjacent to each other in the axial direction of the fuel assembly and determining, in every measurement, soundness of radiation signals measured by the detectors by comparing a relation of radiation signals in the redundant portion with a reference value including a measurement result of a last time; calculating a radiation signal distribution over entire length in the axial direction of the fuel assembly by superimposing, on radiation signals measured by the plural detectors, of which the soundness are determined, radiation signals in a portion where the radiation signals are redundantly measured to combine the radiation signals; and measuring a burn-up profile by calculating relative burn-up based on the radiation signal distribution over the entire length in the axial direction.

Furthermore, the present invention provides, in a third aspect, a burn-up profile measuring method including: setting plural detector units along an axial direction of the fuel assembly at an interval substantially equal to a distance obtained by dividing length of a fuel effective section of the fuel assembly by a number of the detector units to face at least one side of a fuel assembly on which neutrons are irradiated in a nuclear reactor, the detector units including plural detectors that are set at a predetermined interval in the axial direction of the fuel assembly and detect radiation; arranging, at a lower end of the fuel effective section, the detector in a top position in the detector unit in a bottom position and measuring distributions of radiation signals with the detectors of the detector units while relatively moving the fuel assembly and the detector units along the axial direction of the fuel assembly in a distance longer than the interval of the detector units; partially redundantly measuring a same portion of the fuel assembly with the detector units adjacent to each other in the axial direction of the fuel assembly and measuring a same portion in the axial direction of the fuel assembly in a multiplexed manner with the plural detectors in the detector units; determining, in every measurement, soundness of radiation signals measured by the detectors of the detector units by comparing radiation signal distributions measured in a multiplexed manner by the plural detectors in the detector units; calculating a radiation signal distribution over entire length in the axial direction of the fuel assembly by superimposing, on radiation signals measured by the plural detectors of the plural detector units, of which the soundness are determined, radiation signals in a portion redundantly measured by the detector units adjacent to each other in the axial direction of the fuel assembly to combine the radiation signals; and measuring a burn-up profile by calculating relative burn-up based on the radiation signal distribution over the entire length in the axial direction.

The present invention provides, in a first aspect, a burn-up profile measuring program for causing a computer to execute burn-up profile measurement processing for a fuel assembly, and at a time of setting plural detectors, which detect radiation, in an axial direction of the fuel assembly at a predetermined interval to face at least one side of a fuel assembly on which neutrons are irradiated in a nuclear reactor and measuring a burn-up profile utilizing distributions of radiation signals measured by the detectors while relatively moving the fuel assembly and the detectors along the axial direction of the fuel assembly, the burn-up profile measuring program including: determining, in every measurement, soundness of radiation signals measured by the detectors by comparing radiation signal distributions obtained by measuring a same portion in the axial direction of the fuel assembly in a multiplexed manner with these plural detectors; and calculating relative burn-up utilizing the measured radiation signals to measure a burn-up profile after the determination step.

Further, the present invention provides, in a second aspect, a burn-up profile measuring program for causing a computer to execute burn-up profile measurement processing for a fuel assembly, and at a time of setting plural detectors, which detect radiation, along an axial direction of the fuel assembly at an interval substantially equal to a distance obtained by dividing length of a fuel effective section of the fuel assembly by a number of the detectors to face at least one side of a fuel assembly on which neutrons are irradiated in a nuclear reactor, arranging, at a lower end of the fuel effective section, the detector in a bottom position, and measuring a burn-up profile utilizing distributions of radiation signals measured by the detectors while relatively moving the fuel assembly and the detectors along the axial direction of the fuel assembly in a distance longer than the detector interval, the burn-up profile measuring program including: determining, in every measurement, soundness of radiation signals measured by the detectors by comparing radiation signal distributions obtained by measuring a same portion in the axial direction of the fuel assembly in a multiplexed manner with these plural detectors; and calculating relative burn-up utilizing the measured radiation signals to measure a burn-up profile after the determination step.

Furthermore, the present invention provides, in a third aspect, a burn-up profile measuring program for causing a computer to execute burn-up profile measurement processing for a fuel assembly, and at a time of setting plural detectors, which detect radiation, along an axial direction of the fuel assembly at an interval substantially equal to a distance obtained by dividing length of a fuel effective section of the fuel assembly by a number of the detectors to face at least one side of a fuel assembly on which neutrons are irradiated in a nuclear reactor, arranging, at a lower end of the fuel effective section, the detector in a bottom position, and measuring a burn-up profile utilizing distributions of radiation signals measured by the detectors while relatively moving the fuel assembly and the detectors along the axial direction of the fuel assembly in a distance longer than the detector interval, the burn-up profile measuring program including: determining, in every measurement, soundness of radiation signals measured by the detectors by comparing a relation of radiation signals in a redundant portion of the fuel assembly, which is partially redundantly measured by the detectors adjacent to each other in the axial direction of the fuel assembly, with a reference value including a measurement result of a last time; calculating a radiation signal distribution over entire length in the axial direction of the fuel assembly by superimposing, on radiation signals measured by the plural detectors, radiation signals in a portion where the radiation signals are redundantly measured to combine the radiation signals after the determination step; and measuring a burn-up profile by calculating relative burn-up from the radiation signal distribution over the entire length in the axial direction.

With the burn-up profile measuring method and the burn-up profile measuring program according to the present invention, by comparing radiation signal distributions obtained by measuring the same portion in an axial direction of a fuel assembly with plural detectors in a multiplexed manner, soundness of radiation signals measured by the detectors is determined in every measurement and, thereafter, a burn-up profile is measured by utilizing the measured radiation signals. Therefore, it is possible to measure a burn-up profile of the fuel assembly while securing reliability of a measurement result.

With the burn-up profile measuring method and the burn-up profile measuring program according to the present invention, by partially redundantly measuring the same portion of a fuel assembly with detectors adjacent to one another in an axial direction of the fuel assembly and comparing a relation among radiation signals in this redundant portion with reference values including the last measurement result, soundness of radiation signals measured by the detectors is determined in every measurement and, thereafter, by superimposing, on radiation signals measured by the plural detectors, radiation signals in the portion in which the radiation signals are redundantly measured to combine the radiation signals, a radiation signal distribution over the entire length in the axial direction of the fuel assembly is calculated. Since the soundness of the radiation signals measured by the detectors in every measurement is determined in this way, it is possible to measure a burn-up profile of the fuel assembly while securing reliability of a measurement result.

Since distributions of radiation signals are measured by the detectors while the fuel assembly and the detectors are relatively moved along the axial direction of the fuel assembly in a distance longer than a detector interval, the moving distance is reduced and measurement time for the radiation signals can be reduced. Therefore, it is possible to efficiently measure a burn-up profile of the fuel assembly.

Further, with the burn-up profile measuring method and the burn-up profile measuring program according to the present invention, radiation signal distributions measured in a multiplexed manner by plural detectors in detector units are compared, soundness of radiation signals measured by the detectors of the detector units is determined in every measurement, and, thereafter, radiation signals measured by the detectors of the plural detector units are combined by superimposing radiation signals in a portion redundantly measured by the detector units adjacent to one another in the axial direction of the fuel assembly on the radiation signals, and a radiation signal distribution over the entire length in the axial direction of the fuel assembly is calculated. Since soundness of the radiation signals measure by the respective detectors of the detector units is determined in every measurement in this way, it is possible to measure a burn-up profile of the fuel assembly while securing reliability of a measurement result.

Since distributions of radiation signals are measured by the detectors of the detector units while the fuel assembly and the detector units are relatively moved along the axial direction of the fuel assembly in a distance longer than an interval of the detector units, the moving distance is reduced and measurement time for the radiation signals can be reduced. Therefore, it is possible to efficiently measure a burn-up profile of the fuel assembly.

BRIEF DESCRIPTION OF THE DRAWING

FIG. 6A is a side view illustrating, together with a fuel assembly, a detecting device used in a third embodiment of a burn-up profile measuring method according to the present invention and FIG. 6B is a graph illustrating signals measured by detectors illustrated in FIG. 6A;

BEST MODE FOR CARRYING OUT THE INVENTION

Best modes for carrying out the present invention are explained below with reference to the drawings. However, the present invention is not limited to these embodiments. In other words, the present invention also includes modes for carrying out the present invention by deleting several elements from all elements descried in the embodiments or appropriately combining elements described in different embodiments.

[A] First Embodiment (FIGS. 1 to 4)

Figures 1A, 1B:
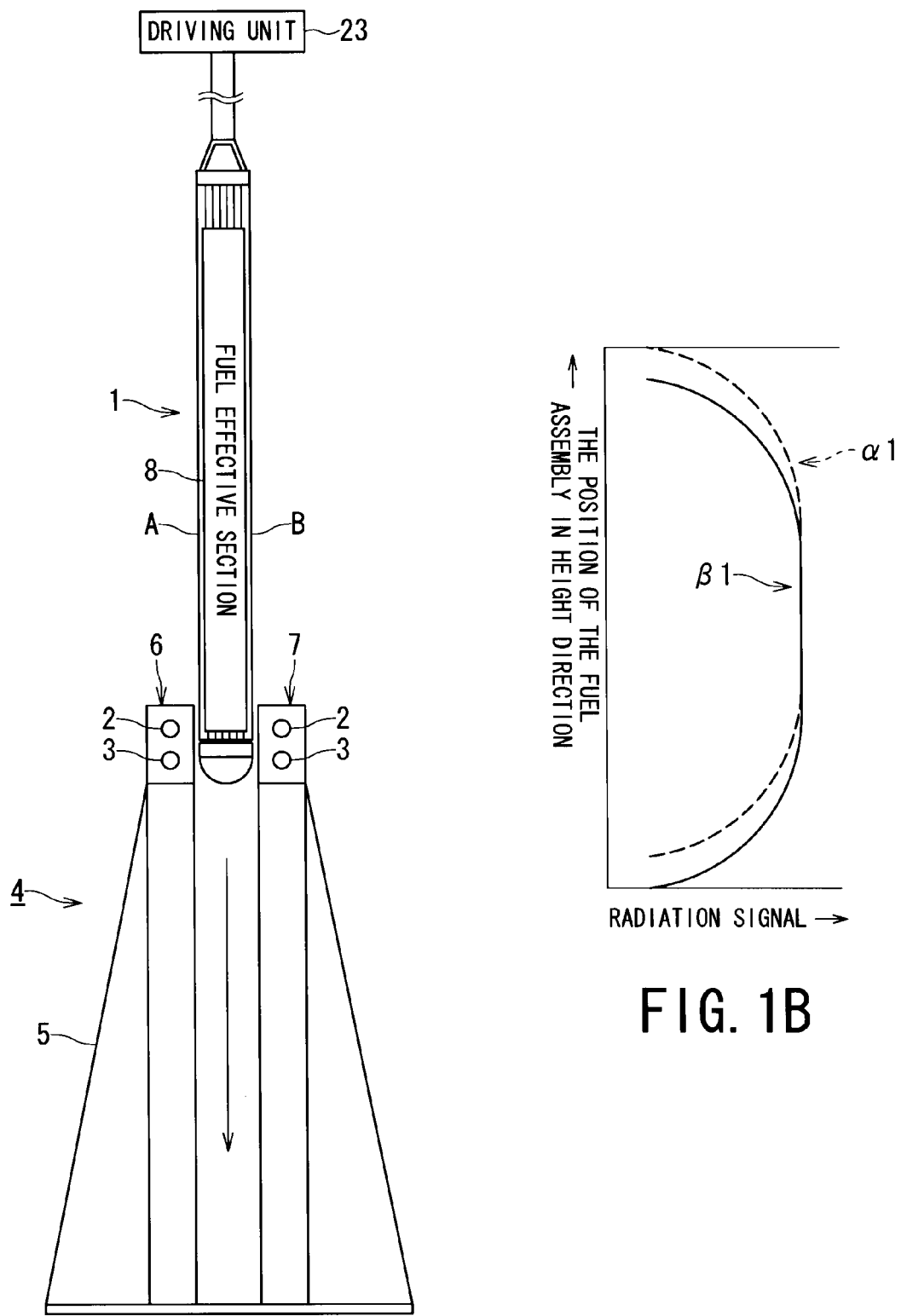
FIG. 1A is a side view illustrating, together with a fuel assembly, a detecting device used in a first embodiment of a burn-up profile measuring method according to the present invention
FIG. 1B is a graph illustrating signals measured by detectors illustrated in FIG. 1A.
Figure 3:
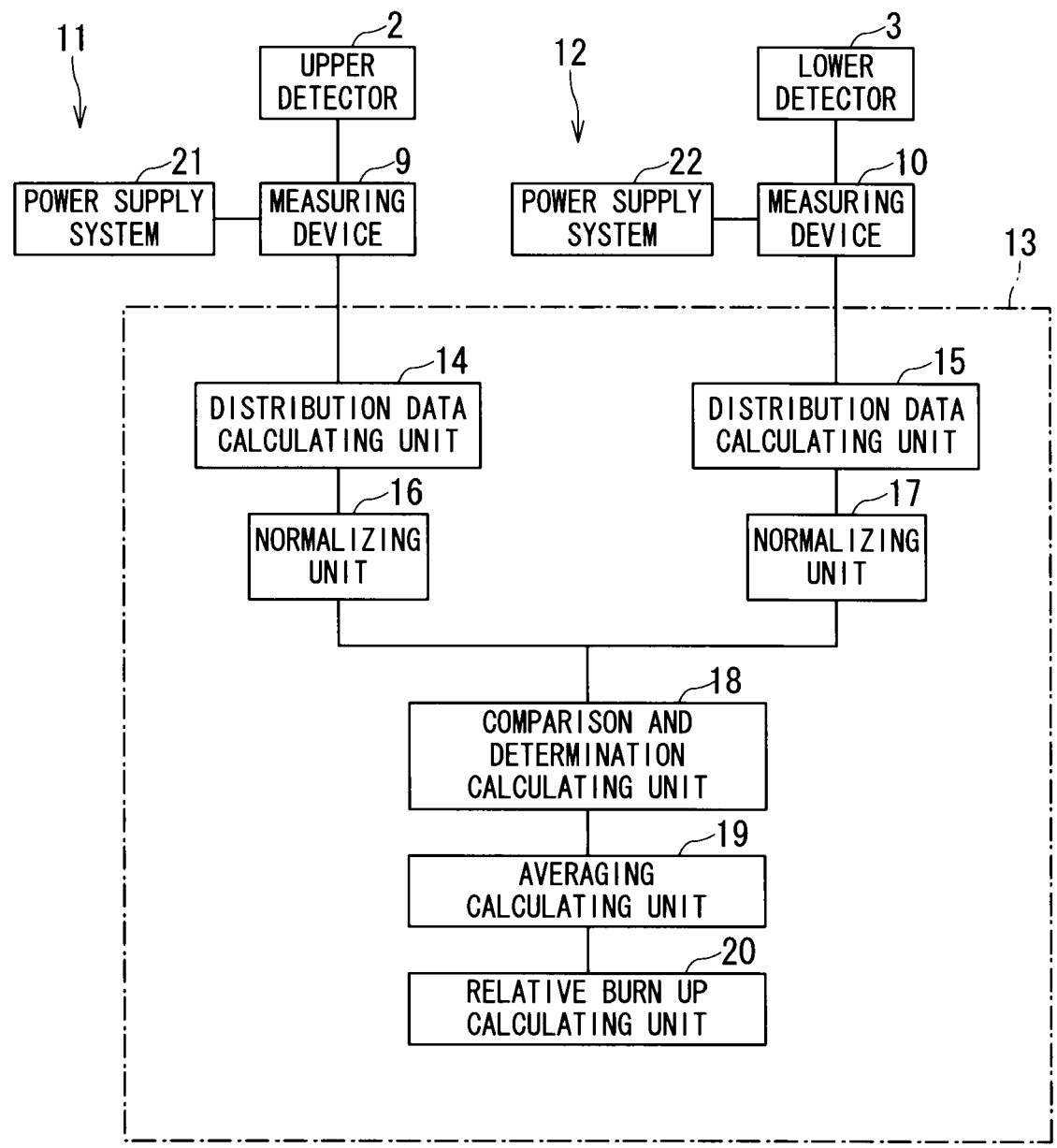
FIG. 3 is a block diagram illustrating a measuring system including the detectors illustrated in FIG. 1A and a signal processing device.

In FIG. 1, i.e., FIGS. 1A and 1B, FIG. 1A is a side view illustrating, together with a fuel assembly, a detecting device used in a first embodiment of a specific burn-up relative distribution (which will be referred to as "burn-up profile", hereinafter) measuring method according to the present invention and FIG. 1B is a graph illustrating signals measured by detectors illustrated in FIG. 1A. FIG. 3 is a block diagram illustrating a measuring system including the detectors illustrated in FIG. 1A and a signal processing device.

In the burn-up profile measuring method in this embodiment, first, plural detectors that detect radiation, for example, upper detectors 2 and lower detectors 3 are set at a predetermined interval in an axial direction of the fuel assembly 1 to face at least one side of a fuel assembly 1 on which neutrons are irradiated in a nuclear reactor.

In a detecting device 4 illustrated in FIG. 1, detector units 6 and 7 are set in opposed positions of a detector holding unit 5. The upper detectors 2 and the lower detectors 3 are included in the detector units 6 and 7. The upper detectors 2 and the lower detectors 3 are arranged close to each other at a distance in a range of 5 to 50 cm, which is relatively short compared with the length in the axial direction of the fuel assembly 1. The fuel assembly 1 is arranged in a center position between the detector units 6 and 7 in the detector holding unit 5.

The upper detectors 2 and the lower detectors 3 of the respective detector units 6 and 7 independently detect radiation signal distributions on sides A and B opposed to each other of the fuel assembly 1. Consequently, burn-up profiles on the opposed sides A and B of the fuel assembly 1 are measured independently from each other as described later. Therefore, in embodiments including this embodiment, a case in which, concerning one side A of the fuel assembly 1, a radiation signal distribution is measured by the detector unit 6 and, concerning the side A of the fuel assembly 1, a burn-up profile is measured on the basis of this radiation signal distribution is explained.

Next, in a state in which the upper detector 2 of the detector unit 6 is located at the lower end of a fuel effective section 8 of the fuel assembly 1, distributions of radiation signals are measured concerning the side A of the fuel assembly 1 by the upper detector 2 and the lower detector 3 of the detector unit 6 while the fuel assembly 1 and the upper detector 2 and the lower detector 3 of the detector unit 6 are relatively moved along the axial direction of the fuel assembly 1.

The relative movement of the fuel assembly 1 and the upper detector 2 and the lower detector 3 is performed by a driving unit 23 that moves at least one of the fuel assembly 1 and the upper and lower detectors 2 and 3. For example, the detecting device 4 illustrated in FIG. 1A includes the detector holding unit 5 that holds the upper detectors 2 and the lower detectors 3 and the driving unit 23 that moves the fuel assembly 1 in an up to down direction. The driving unit 23 performs the relative movement of the fuel assembly 1 and the upper detectors 2 and the lower detectors 3.

The driving unit 23 illustrated in FIG. 1A as an example has a driving mechanism such as a motor. With an action of the driving mechanism, while keeping a state in which the driving unit 23 grips the upper end of the fuel assembly 1 and suspends the fuel assembly 1, in measurement, the driving unit 23 can move the fuel assembly 1 in the up to down direction, for example, move the fuel assembly 1 downward (an arrow direction illustrated in FIG. 1A) from an initial position and lift the fuel assembly 1 upward after the measurement. The driving mechanism can be appropriately selected out of driving mechanisms that can be obtained by adopting a conventional (publicly-known) technique. For example, it is also possible to provide a stand that holds and supports the fuel assembly 1 from below and to move the stand in the up to down direction with a hydraulic mechanism (a hydraulic piston).

In the detecting device 4 illustrated in FIG. 1A, the relative movement of the fuel assembly 1 and the upper detectors 2 and the lower detectors 3 is performed by moving the fuel assembly 1 downward relatively to the upper detectors 2 and the lower detectors 3. However, as in the detecting device 4 illustrated in FIG. 2A, it is also possible that the driving unit 23 is provided in the detector holding unit 5 that holds the detector unit 6 including the upper detector 2 and the lower detector 3 and the detector unit 6 is moved upward (an arrow direction illustrated in FIG. 2A) along the axial direction of the fuel assembly 1 with an action of a driving mechanism of the driving unit 23 to perform the relative movement of the fuel assembly 1 and the upper detector 2 and the lower detector 3.

Figure 2A:
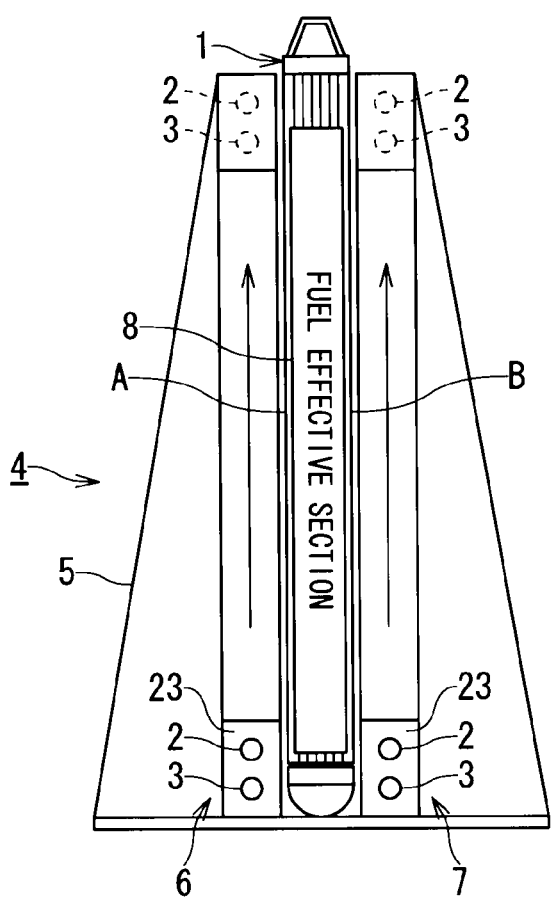
FIG. 2A is a side view illustrating, together with a fuel assembly, another aspect of the detecting device illustrated in FIG. 1A
Figure 2B:
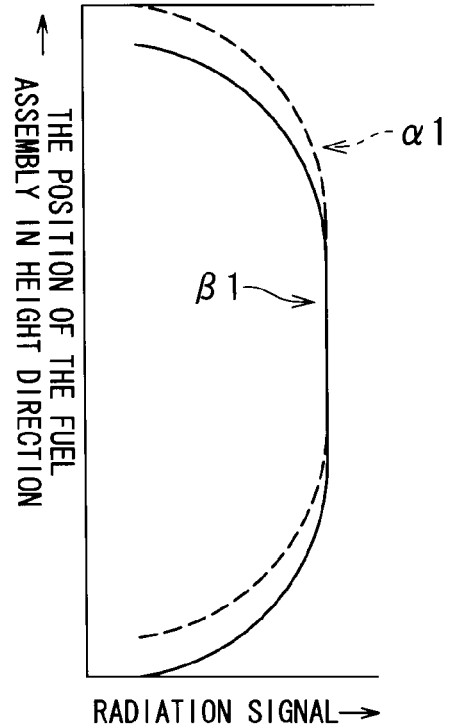
FIG. 2B is a graph illustrating signals measured by detectors illustrated in FIG. 2A.

The driving mechanism of the driving unit 23 illustrated in FIG. 2A as an example is also appropriately selected out of driving mechanisms that can be obtained by adopting the publicly-known technique. For example, it is also possible to adopt a driving mechanism that drives the detector units 6 and 7 in the up to down direction according to the rotation of a screw shaft and a driving mechanism that suspends the detector units 6 and 7 with wires and winds and feeds the wires with a motor or the like to drive the detector units 6 and 7 in the up to down direction.

By performing the relative movement of the fuel assembly 1 and the upper detectors 2 and the lower detectors 3 in the detector units 6 and 7 according to an action of the driving unit 23 configured as described above, concerning the sides A and B of the fuel assembly 1, it is possible to measure distributions of radiation signals in a multiplexed manner over substantially the entire length of the fuel effective section 8.

Next, by comparing radiation signal distributions measured in a multiplexed manner concerning the fuel effective section 8 of the fuel assembly 1 by the upper detector 2 and the lower detector 3 of the detector unit 6, soundness of radiation signals measured by the upper detector 2 and the lower detector 3 is determined in every measurement. As described later, the determination concerning the soundness of the radiation signals is carried out by normalizing the radiation signals measured in a multiplexed manner by the upper detector 2 and the lower detector 3 of the detector unit 6, respectively, and comparing a maximum of a difference between normalized values of the radiation signals with a determination value.

In FIG. 1B, the radiation signal distribution measured by the upper detector 2 is indicated by a broken line $\alpha 1$ and the radiation signal distribution measured by the lower detector 3 is indicated by a solid line $\beta 1$. The distributions of the radiation signals measured by the upper detector 2 and the lower detector 3 originally have the same shape, although absolute values of signals are different depending on a difference in sensitivities of the detectors. However, in the event that the upper detector 2 or the lower detector 3 is in an abnormal state because of a failure, unexpected noise, or the like, distributions of radiation signals measured by the upper detector 2 and the lower detector 3 deviate from the same shape. Therefore, by comparing the radiation signals measured by the upper detector 2 and the lower detector 3, it is possible to determine abnormality of these signals.

Thereafter, relative specific burn-up (relative burn-up) is calculated by utilizing the radiation signals measured by the upper detector 2 and the lower detector 3 of the detector unit 6 and a burn-up profile in the axial direction is measured concerning the side A of the fuel assembly 1.

The calculation of relative burn-up from radiation signals is different depending on a type of radiation signals to be measured. Specifically, when the upper detector 2 and the lower detector 3 are ionization chambers that measure a gamma ray, which is a radiation, as a gamma ray energy gross amount, i.e., a gross gamma ray without discriminating the gamma ray by energy, a signal distribution of this gross gamma ray and a relative burn-up distribution do not always coincide with each other. Therefore, in this case, a relation between the radiation signal (the gross gamma ray signal) and the relative burn-up is calculated in advance by utilizing, for example, Expression (4) disclosed in Patent Document 2 by the inventor and the relative burn-up is calculated from the radiation signal (the gross gamma ray signal) by utilizing this relation.

When the upper detector 2 and the lower detector 3 are detectors having high energy resolution such as Ge semiconductor detectors and a gamma ray of 662 keV emitted from 137 Cs is measured as a radiation, a signal distribution of this gamma ray coincides with the relative burn-up distribution. Therefore, in this case, it is possible to immediately calculate the relative burn-up from the radiation signals detected by the upper detector 2 and the lower detector 3. However, in all the embodiments including this embodiment, ionization chambers with a simple apparatus configuration are used as the upper detector 2 and the lower detector 3.

Each of the upper detectors 2 and each of the lower detectors 3 illustrated in FIG. 1 are respectively connected to measuring devices 9 and 10 as illustrated in FIG. 3. A measuring system 11 is configured by the upper detector 2 and the measuring device 9. A measuring system 12 is configured by the lower detector 3 and the measuring device 10. Both a radiation signal (upper detector signal) detected by the upper detector 2 and amplified by the measuring device 9 and a radiation signal (lower detector signal) detected by the lower detector 3 and amplified by the measuring device 10 are input to a signal processing device 13. The signal processing device 13 is a computer and has functional units; distribution-data calculating units 14 and 15, normalizing units 16 and 17, a comparison and determination calculating unit 18, an averaging calculating unit 19, and a relative burn-up calculating unit 20. Steps ST1 to ST14 (FIG. 4) described later for realizing functions of these functional units are stored in a not-illustrated storage device as a computer program.

The measuring devices 9 and 10 amplify the respective radiation signals from the upper detector 2 and the lower detector 3 as described above. In a flowchart of FIG. 4, the measuring device 9 executes steps ST1 and ST2 and the measuring device 10 executes steps ST1 and ST3.

The distribution-data calculating unit 14 calculates distribution data that associates a measuring position of the upper detector 2 relative to the fuel assembly 1 and an upper detector signal obtained by the upper detector 2. The distribution-data calculating unit 15 calculates distribution data that associates a measuring position of the lower detector 3 relative to the fuel assembly 1 and a lower detector signal obtained by the lower detector 3. The distribution-data calculating unit 15 executes steps ST6 and ST7 of the flowchart of FIG. 4.

The normalizing unit 16 normalizes the upper detector signal to calculate a normalized value. The normalizing unit 16 executes step ST8 of the flowchart of FIG. 4. The normalizing unit 17 normalizes the lower detector signal and calculates a normalized value. The normalizing unit 17 executes step ST9 of the flowchart of FIG. 4.

The comparison and determination calculating unit 18 compares a maximum of a difference between the normalized values calculated by the normalizing units 16 and 17 with a determination value and determines soundness of radiation signals measured by the upper detector 2 and the lower detector 3. The comparison and determination calculating unit 18 executes steps ST10 to ST12 of the flowchart of FIG. 4.

The averaging calculating unit 19 calculates an average of an upper detector signal and a lower detector signal measured in a multiplexed manner by the upper detector 2 and the lower detector 3. The averaging calculating unit 19 executes step ST13 of the flowchart of FIG. 4.

The relative burn-up calculating unit 20 calculates relative burn-up from the average of the upper detector signal and the lower detector signal calculated by the averaging calculating unit 19 and calculates a burn-up profile. The relative-specific-burn-up calculating unit 20 executes step ST14 of the flowchart of FIG. 4.

Figure 4:
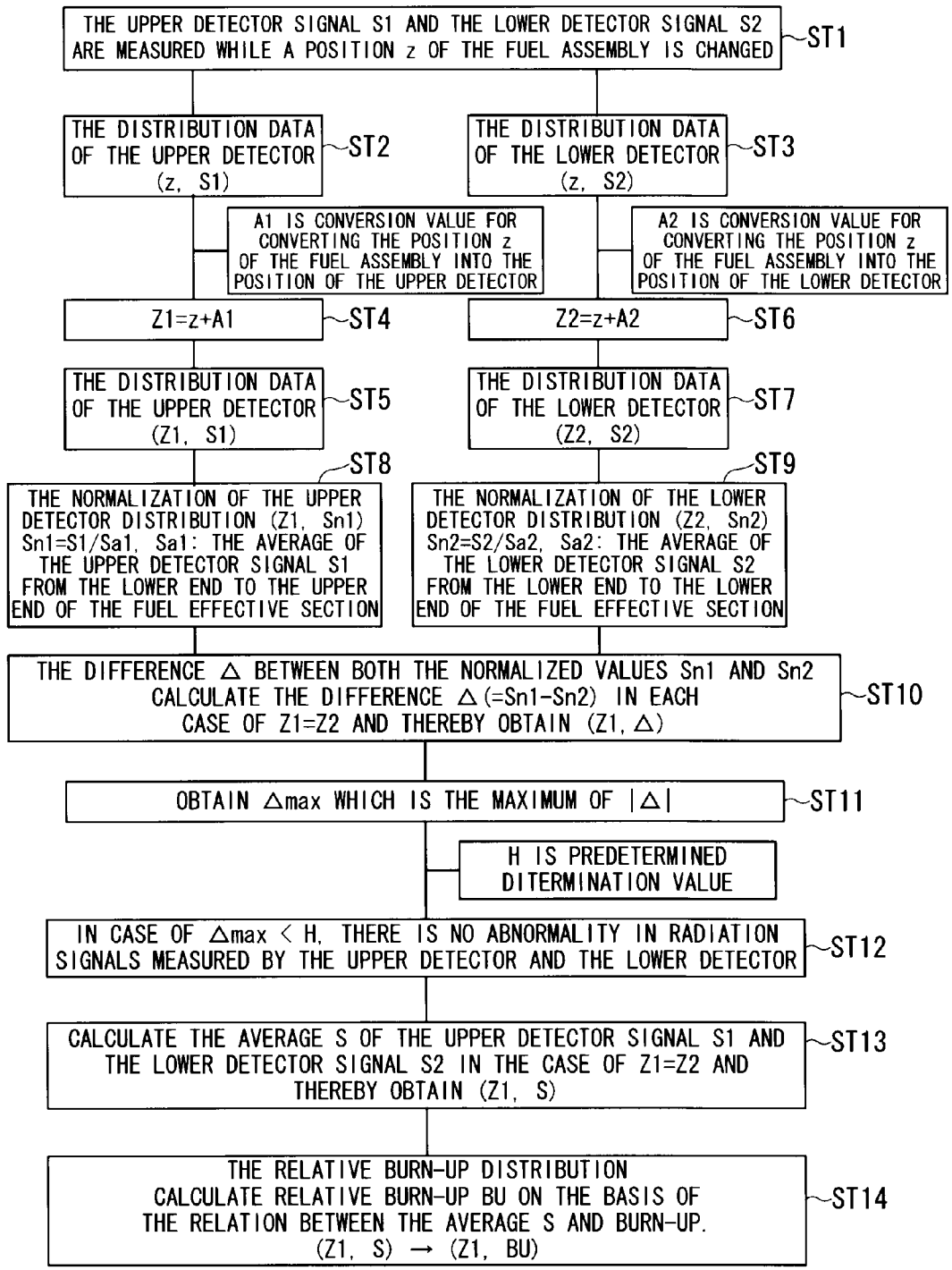
FIG. 4 is a flowchart showing a burn-up profile measuring method executed by the measuring system and the signal processing device, illustrated in FIG. 3.

A procedure of burn-up profile measurement executed by this signal processing device 13 is explained below with reference to FIG. 4.

In a state in which the upper detector 2 and the lower detector 3 of the detector unit 6 are set adjacent to each other to face the side A of the fuel assembly 1, an upper detector signal S1 is measured by the upper detector 2 and a lower detector signal S2 is measured by the lower detector 3 while a position z of the fuel assembly 1 is changed (ST1, 2, and 3).

A value A1 for converting the position z of the fuel assembly 1 into the position of the upper detector 2 and a value A2 for converting the position z of the fuel assembly 1 into the position of the lower detector 3 are determined according to matching of installation positions of the upper detector 2 and the lower detector 3 in the detecting device 4 and the driving device for the fuel assembly 1. The conversion value A1 is added to the position z of the fuel assembly 1 to calculate a measuring position Z1 of the upper detector 2 relative to the fuel assembly 1 (ST4 and 5). The conversion value A2 is added to the position z of the fuel assembly 1 to calculate a measuring position Z2 of the lower detector 3 relative to the fuel assembly 1 (ST6 and 7).

An upper detector signal S1 from the lower end to the upper end of the fuel effective section 8 in the fuel assembly 1 is divided by an average Sa1 of the upper detector signal S1 to calculate a normalized value Sn1 of the upper detector signal S1 (ST8). Similarly, a lower detector signal S2 from the lower end to the upper end of the fuel effective section 8 in the fuel assembly 1 is divided by an average Sa2 of the lower detector signal S2 to calculate a normalized value Sn2 of the lower detector signal S2 (ST9).

When the upper detector 2 and the lower detector 3 measure the same position of the fuel effective section 8 in the fuel assembly 1, i.e., in each case of Z1=Z2, in a multiplexed manner, a difference $\Delta$ between both the normalized values Sn1 and Sn2 is calculated (ST10) and a maximum $\Delta$max of an absolute value of this difference $\Delta$ is calculated (ST11). When this maximum $\Delta$max is smaller than a determination value H determined in advance, it is determined that there is no abnormality in radiation signals measured by the upper detector 2 and the lower detector 3, respectively (ST12).

Since this difference $\Delta$ is a difference between the normalized values Sn1 and Sn2 normalized such that an average is 1, when measurement is normally performed, the difference $\Delta$ is a value close to 0. Therefore, the determination value H is determined by taking into account measurement errors due to fluctuation of both the detector signals S1 and S2, positional deviation of the fuel assembly 1, and the like.

An average S of the upper detector signal S1 and the lower detector signal S2 in the case in which the upper detector 2 and the lower detector 3 measure the same position of the fuel effective section 8, i.e., in the case of Z1=Z2 is calculated (ST13). As this average S, a geometric average of the upper detector signal S1 and the lower detector signal S2 may be used. This geometric average is also referred to as geometric mean and is a square root of a product of the upper detector signal S1 and the lower detector signal S2.

A relation between the average S of both the upper and lower detector signals S1 and S2 and specific burn-up is calculated in advance. By utilizing this relation, relative burn-up BU is calculated from the average S calculated in step ST13 and a burn-up profile is calculated (ST14).

Therefore, according to this embodiment, effects (1) and (2) explained below are realized.

(1) The same portion in an axial direction in the fuel effective section 8 of the fuel assembly 1 is measured in a multiplexed manner by the upper detector 2 and the lower detector 3. By comparing a maximum of a difference between normalized values of both upper and lower detector signals of the upper detector 2 and the lower detector 3 with the determination value H, soundness of the upper detector signal and the lower detector signal measured by the upper detector 2 and the lower detector 3 is determined in every measurement. Thereafter, relative burn-up is calculated by utilizing an average of both the upper and lower detector signals and a burn-up profile is measured. Therefore, it is possible to measure a burn-up profile of the fuel assembly 1 while securing reliability of a measurement result.

(2) A large number of detectors are not set on the side A of the fuel assembly 1 and only two detectors (i.e., the upper detector 2 and the lower detector 3) are set. Therefore, compared with the case in which the number of detectors is large, a failure rate of the detectors is low and maintenance cost can be reduced.

The upper detector 2, the measuring device 9, and a power supply system 21 (FIG. 3) to the measuring device 9 and the lower detector 3, the measuring device 10, and a power supply system 22 to the measuring device 10 are configured according to the systems in a multiplexed manner. Therefore, when occurrence of abnormality such as a failure or noise is found in any one of the multiplexed systems, if the other system can be confirmed as normal, it is also possible to measure a burn-up profile utilizing radiation signals measured by the normal system.

It is also possible that measuring accuracy is improved by averaging detector signals (radiation signals) of the upper detectors 2 or the lower detectors 3 arranged on the opposed sides A and B of the fuel assembly 1 and a burn-up profile is calculated for each fuel assembly 1 rather than for each of the sides A and B of the fuel assembly 1. In this case, it is desirable to set each of the upper detectors 2 and the lower detectors 3 on opposed two sides or four sides of the fuel assembly 1. As disclosed in Patent Document 3 by the inventors, it is possible to further improve the measurement accuracy by calculating a geometric average of detector signals of the upper detectors 2 or the lower detectors 3 concerning the opposed two sides of the fuel assembly 1 in the averaging described above.

Specifically, the geometric average is also referred to as geometric mean and is a square root of a product of two values. When the position of the fuel assembly 1 shifts in the horizontal direction to be slightly closer to the detector on one side than a predetermined position, this fuel assembly 1 moves away from the detector on the opposite side by the same distance. When a radiation passes through a shield such as water, radiation intensity attenuates as an exponential function of a distance of passage. Therefore, when original values are the same, a product of the value that exponentially decreases by the same distance and the value that exponentially increases by the same distance is a square of the original value with the influence due to the exponential function offset. Therefore, a square root, i.e., a geometric average of the value is the original value. The geometric average is effective when radiation intensities of the opposed two sides in the fuel assembly 1 are close values.

Figure 5:
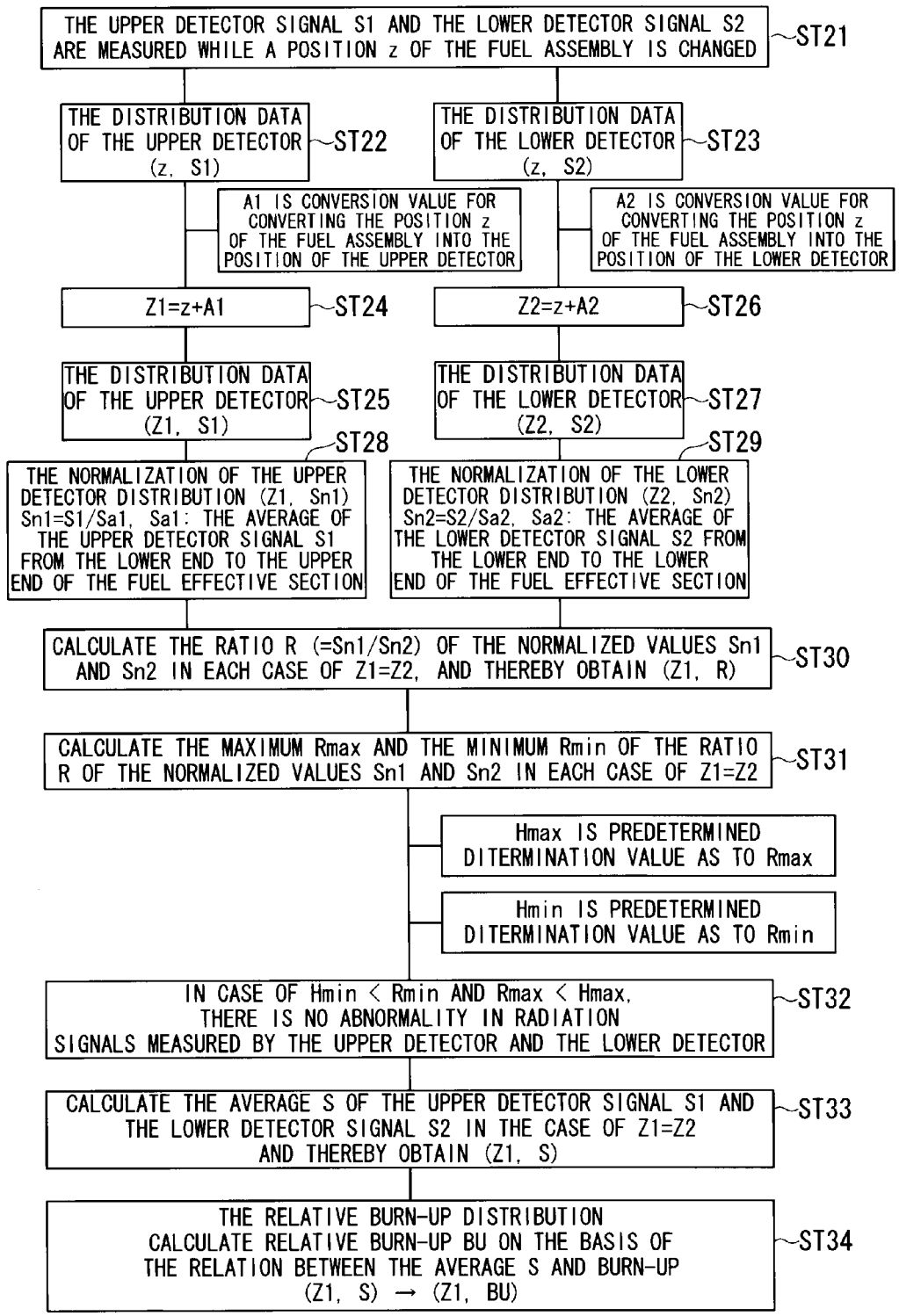
FIG. 5 is a flowchart showing a second embodiment of a burn-up profile measuring method according to the present invention.

[B] Second Embodiment (FIG. 5)

FIG. 5 is a flowchart illustrating a second embodiment of the burn-up profile measuring method according to the present invention. In this second embodiment, components same as those in the first embodiment are denoted by the same reference numerals and signs and explanation of the components is simplified or omitted.

The burn-up profile measuring method according to this embodiment is different from the first embodiment in a procedure for determining soundness of radiation signals measured by the upper detector 2 and the lower detector 3, respectively. Specifically, after radiation signals (an upper detector signal and a lower detector signal) measured in a multiplexed manner by the upper detector 2 and the lower detector 3 are normalized, soundness of the radiation signals measured by the upper detector 2 and the lower detector 3 is determined by comparing a maximum and a minimum of ratios of these normalized values with determination values therefor.

A procedure for measuring a burn-up profile according to this embodiment is explained below with reference to FIG. 5.

The normalized value Sn1 of the upper detector signal S1 by the upper detector 2 and the normalized value Sn2 of the lower detector signal S2 by the lower detector 3 are calculated in steps same as steps ST1 to ST9 of the first embodiment (ST21 to ST29).

When the upper detector 2 and the lower detector 3 measure the same position of the fuel effective section 8 in the fuel assembly 1, i.e., in each case of Z1=Z2, ratios R of the normalized values Sn1 and Sn2 are calculated (ST30). Next, a maximum Rmax and a minimum Rmin of the ratios R are calculated (ST31). When the minimum Rmin of these ratios is larger than a determination value Hmin determined in advance and the maximum Rmax is smaller than a determination value Hmax determined in advance, it is determined that there is no abnormality in radiation signals measured by the upper detector 2 and the lower detector 3, respectively (ST32).

Since these ratios R are ratios of the normalized values Sn1 and Sn2 normalized such that an average is 1, when the measurement is normally performed, the ratios R are values close to 1. As in the first embodiment, the minimum value Hmin and the maximum value Hmax of these ratios are determined by taking into account a measurement error due to fluctuation in both the detector signals S1 and S2, positional deviation of the fuel assembly 1, and the like.

As in steps ST13 and 14 of the first embodiment, the average S of the upper detector signal S1 and the lower detector signal S2 in the case of Z1=Z2 is calculated (ST33). The relative burn-up BU is calculated from the average S, which is calculated in step ST33, by utilizing the relation calculated in advance between the average S of both the upper and lower detector signals S1 and S2 and the specific burn-up and a burn-up profile of the fuel assembly 1 is calculated (ST34).

Therefore, in this embodiment, since soundness of radiation signals measured by the upper detector 2 and the lower detector 3, respectively, is determined in every measurement, effects same as the effects (1) and (2) of the first embodiment are realized.

[C] Third Embodiment (FIGS. 6 to 9)

In FIG. 6, i.e., FIGS. 6A and 6B, FIG. 6A is a side view illustrating, together with a fuel assembly, a detecting device used in a third embodiment of the burn-up profile measuring method according to the present invention and FIG. 6B is a graph illustrating signals measured by the detectors illustrated in FIG. 6A. In this third embodiment, components same as those in the first embodiment are denoted by the same reference numerals and signs and explanation of the components is simplified or omitted.

In the burn-up profile measuring method in this embodiment, first, the upper detectors 2 and the lower detectors 3 that detect radiation are arranged along the axial direction of the fuel assembly 1 to respectively face the opposed sides A and B of the fuel assembly 1 on which neutrons are irradiated in a nuclear reactor. The upper detectors 2 and the lower detectors 3 are arranged along the axial direction of the fuel assembly 1 to be spaced apart by a distance about a half of the length of the fuel effective section 8 of the fuel assembly 1, preferably, spaced apart by a distance slightly shorter than the half of the length of the fuel effective section 8. Specifically, in a detector holding unit 31 of a detecting device 30, the upper detectors 2 are arranged in an upper part thereof and the lower detectors 3 are arranged below the upper detectors 2 by the distance about the half of the length of the fuel effective section 8 (preferably the distance slightly shorter than the half of the length of the fuel effective section 8).

Next, in a state in which the lower detectors 3 are located at the lower end of the fuel effective section 8 of the fuel assembly 1, distributions of radiation signals are measured by the upper detectors 2 and the lower detectors 3 while the fuel assembly 1 is moved downward along the axial direction by the distance slightly longer than about the half of the length of the fuel effective section 8. When the distributions are measured, a radiation signal distribution in a range of a substantial upper half in the fuel effective section 8 of the fuel assembly 1 is measured by the upper detectors 2 and a radiation signal distribution of a substantial lower half of the fuel effective section 8 is measured by the lower detectors 3. Further, a radiation signal distribution of a vertical substantial center portion of the fuel effective section 8 is redundantly measured by the upper detectors 2 and the lower detectors 3.

Figure 7A:
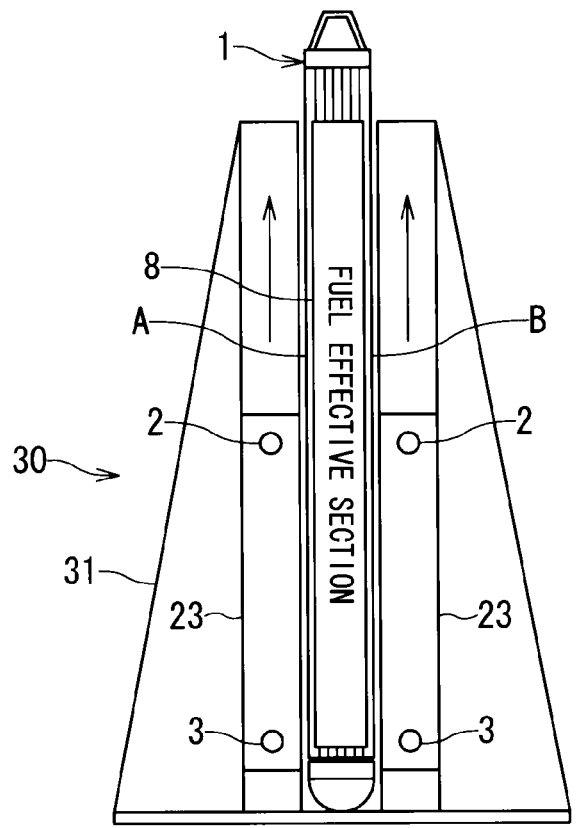
FIG. 7A is a side view illustrating, together with a fuel assembly, another aspect of the detecting device illustrated in FIG. 6A
Figure 7B:
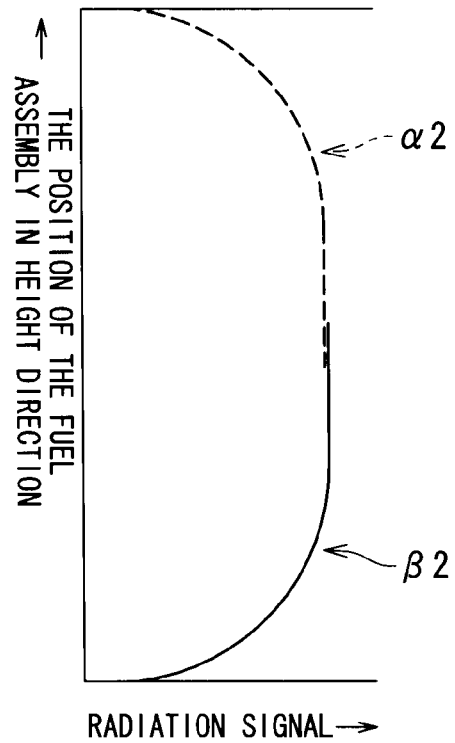
FIG. 7B is a graph illustrating signals measured by detectors illustrated in FIG. 7A.

Instead of moving the fuel assembly 1 downward relatively to the upper detectors 2 and the lower detectors 3 fixedly arranged in the detector holding unit 31, as illustrated in FIG. 7A, the upper detectors 2 and the lower detectors 3 may be moved upward relatively to the fuel assembly 1. Specifically, in a state in which a spaced apart distance of the upper detectors 2 and the lower detectors 3 is maintained at a distance about a half of the fuel effective section 8, the upper detectors 2 and the lower detectors 3 are slid upward relatively to the detector holding unit 31 along the axial direction of the fuel assembly 1. It is also possible that a radiation signal distribution in the upper half range of the fuel effective section 8 is measured by the upper detectors 2, a radiation signal distribution in the lower half range is measured by the lower detectors 3, and a radiation signal distribution in the vertical substantial center portion is measured by the upper detectors 2 and the lower detectors 3 while the upper detectors 2 and the lower detectors 3 are moved (slid) relatively to the fuel assembly 1 by a distance slightly longer than about the half of the fuel effective section 8.

Next, soundness of the radiation signals measured by the upper detectors 2 and the lower detectors 3 is determined. Specifically, ratios of the radiation signals are calculated concerning the vertical substantial center portion of the fuel effective section 8 of the fuel assembly 1 where the upper detectors 2 and the lower detectors 3 redundantly measure radiation signal distributions. An average, a maximum, and a minimum of the ratios are compared with reference values including an average of ratios of radiation signals obtained in the same manner in the last measurement, i.e., the average of the ratios and a determination value determined in advance. According to this comparison, soundness of the radiation signals measured by the upper detectors 2 and the lower detectors 3 is determined.

In FIG. 6B, the radiation signal distribution measured by the upper detectors 2 is indicated by a broken line α2 and the radiation signal distribution measured by the lower detectors 3 is indicated by a solid line β2. Intensity of measurement signals obtained when the same portion of the fuel effective section 8 in the fuel assembly 1 is redundantly measured by the upper detectors 2 and the lower detectors 3 is substantially the same regardless of which fuel assembly 1 is measured, although there is a difference depending on sensitivity of the detectors. Therefore, by comparing the ratios of the radiation signals in the portion redundantly measured by the upper detectors 2 and the lower detectors 3 with, for example, ratios of radiation signals obtained in the same manner in the last measurement, it is possible to determine presence or absence of a failure and a change in sensitivity of the upper detectors 2 and the lower detectors 3 in every measurement.

After this determination, the radiation signals measured by the upper detectors 2 and the lower detectors 3, respectively, are corrected to the same sensitivity level. A radiation signal distribution over the entire length in the axial direction of the fuel assembly 1 is calculated by superimposing, on the radiation signals measured by the upper detectors 2 and the lower detectors 3, radiation signals in the portion where the radiation signals are redundantly measured to combine the radiation signals. Relative burn-up is calculated from this radiation signal distribution over the entire length in the axial direction to measure a burn-up profile of the fuel assembly 1.

Figure 8:
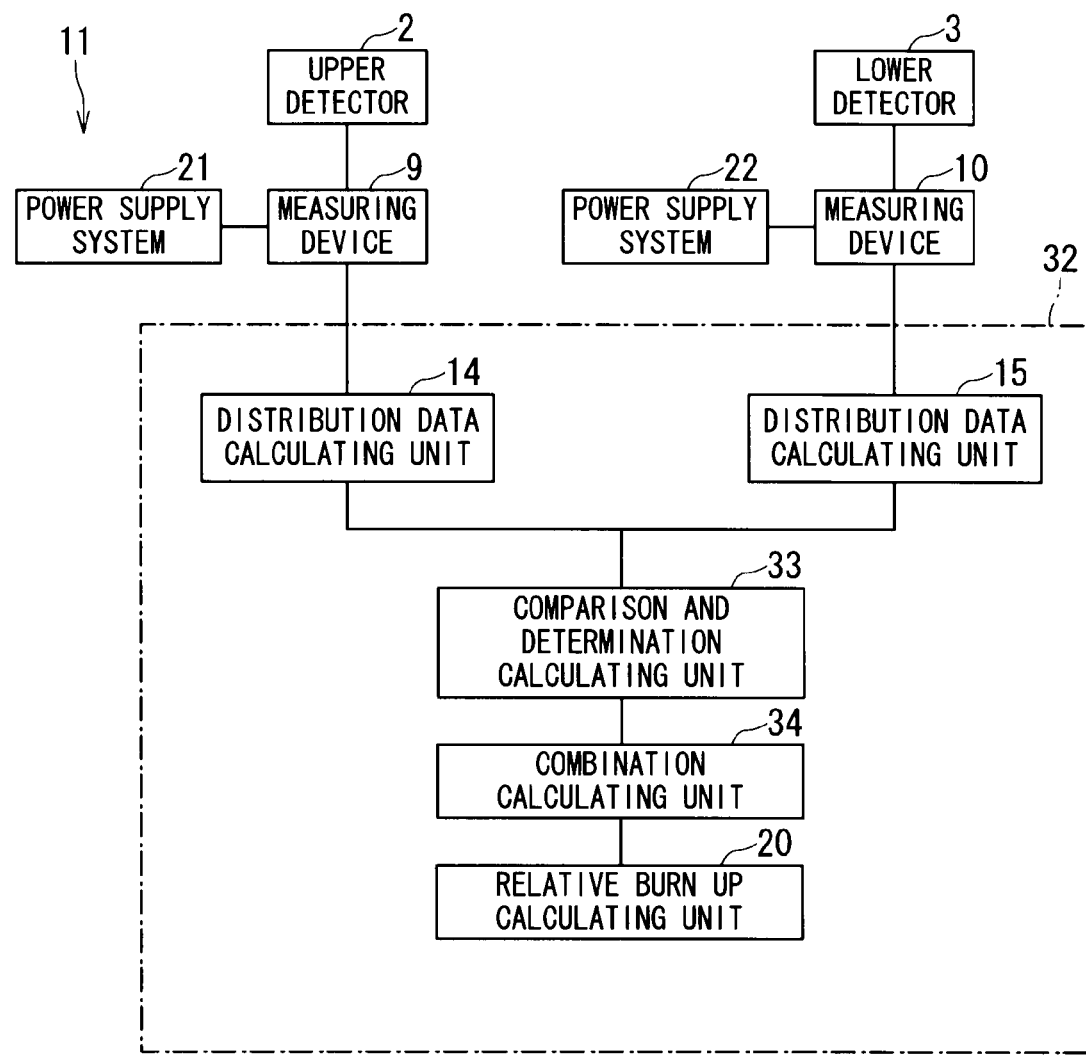
FIG. 8 is a block diagram illustrating a measuring system including the detectors illustrated in FIG. 7A and a signal processing device.

The measurement of the burn-up profile described above is mainly carried out by a signal processing device 32 illustrated in FIG. 8. This signal processing device 32 has a configuration substantially the same as that of the signal processing device 13 according to the first embodiment. However, the normalizing units 16 and 17 of the signal processing device 13 are omitted, details of the comparison and determination calculating unit 33 are different from those of the comparison and determination calculating unit 18 of the signal processing device 13, and a combination calculating unit 34 is provided instead of the averaging calculating unit 19 of the signal processing device 13. This signal processing device 32 is also a computer. Steps ST41 to ST53 described later for driving this signal processing device 32 are stored in a not-illustrated storage device as a computer program.

Figure 9:
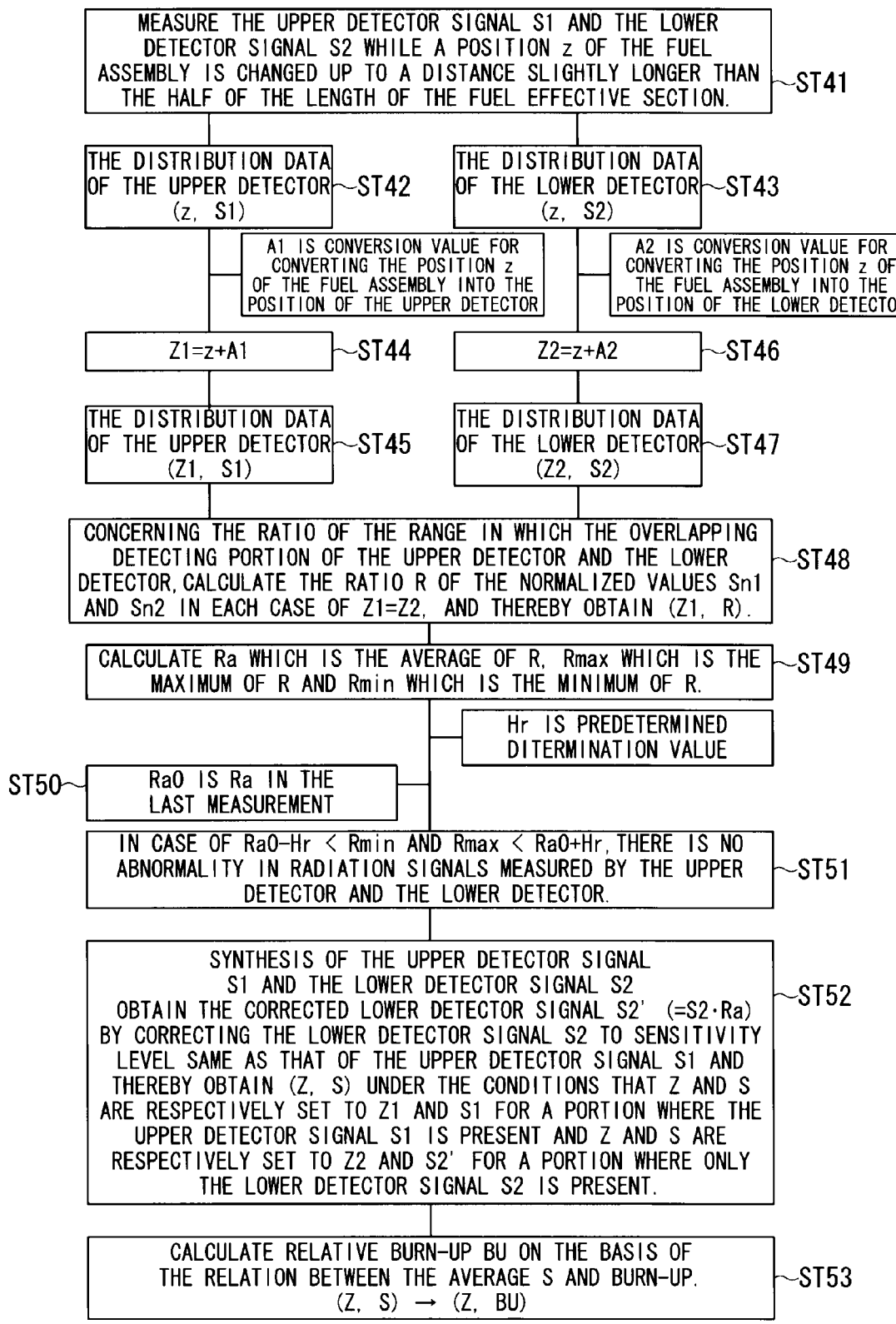
FIG. 9 is a flowchart showing a burn-up profile measuring method executed by the measuring system and the signal processing device, illustrated in FIG. 8.

A relation between this signal processing device 32 and the measuring devices 9 and 10 and steps ST41 to ST53 illustrated in FIG. 9 executed by the signal processing device 32 and the measuring devices 9 and 10 is described below. The measuring device 9 executes steps ST41 and ST42 and the measuring device 10 executes steps ST41 and ST43. The distribution-data calculating unit 14 executes steps ST44 and ST45 and the distribution-data calculating unit 15 executes steps ST46 and ST47. The comparison and determination calculating unit 33 calculates ratios of radiation signals concerning a portion redundantly measured by the upper detectors 2 and the lower detectors 3 and determines soundness of these radiation signals. The comparison and determination calculating unit 33 executes steps ST48 to ST51. The combination calculating unit 34 combines radiation signals (also referred to as upper detector signal and lower detector signal)

measured by the upper detectors and the lower detectors, respectively, to calculate a radiation signal distribution in the axial direction of the fuel assembly 1. The combination calculating unit 34 executes step ST52. The relative-specific-burn-up calculating unit 20 executes step ST53.

A procedure of burn-up profile measurement executed by the signal processing device 32 and the like is explained below with reference to FIG. 9.

In a state in which, for example, the upper detector 2 and the lower detector 3 are set vertically spaced apart by a distance of about the half of the length of the fuel effective section 8 to face, for example, the side A of the fuel assembly 1, the fuel assembly 1 is set such that the lower end of the fuel effective section 8 is in the position of the lower detector 3. Next, while the position z of the fuel assembly 1 is changed up to a distance slightly longer than the half of the length of the fuel effective section 8, the upper detector signal S1 is measured by the upper detector 2 and the lower detector signal S2 is measured by the lower detector 3 (ST41, 42, and 43).

The value A1 for converting the position z of the fuel assembly 1 into the position of the upper detector 2 is added to this position z to calculate the measuring position Z1 of the upper detector 2 relative to the fuel assembly 1 (ST44 and 45). The value A2 for converting the position z of the fuel assembly 1 into the position of the lower detector 3 is added to this position z to calculate the measuring position Z2 of the lower detector 3 relative to the fuel assembly 1 (ST46 and 47).

Concerning a range in which an overlapping portion of the upper detector 2 and the lower detector 3, i.e., a portion of Z1=Z2 is present, the ratios R of the upper detector signal S1 and the lower detector signal S2 at the time of Z1=Z2 are calculated (ST48). An average Ra, the maximum Rmax, and the minimum Rmin of this R are calculated (ST49). The ratios R in this case are generally ratios of sensitivities of the detectors 2 and 3 when measurement is normally performed.

Next, the average Ra of the ratios R obtained by the same method in the last measurement is represented as Ra0 (ST50). When the minimum Rmin is larger than a value obtained by subtracting a determination value Hr determined in advance from the average Ra0 of the last ratios and the maximum Rmax is smaller than a value obtained by adding the determination value Hr determined in advance to the average Ra0 of the last ratios, it is determined that there is no abnormality in radiation signals measured by the upper detector 2 and the lower detector 3, respectively (ST51). In this determination, it is determined that a sensitivity ratio of the upper detector 2 and the lower detector 3 does not change compared with measurement performed last time. It is confirmed that no sensitivity change and failure occur in these detectors 2 and 3.

As a reference to be compared with the average Ra of the ratios R in the measurement, it is assumed that, besides the average Ra0 of the ratios R obtained in the last measurement, an average of averages Ra of ratios obtained in all of plural times of measurement up to that point is used or a value with high reliability obtained by carefully testing the detecting device 30 at the start of operation of the detecting device 30.

Next, a corrected lower detector signal S2' obtained by correcting the lower detector signal S2 to a sensitivity level same as that of the upper detector signal S1 is calculated by multiplying the lower detector signal S2 with the average Ra of the ratios (ST52). S is set to S1 for a portion where the upper detector signal S1 is present and S is set to S2' for a portion where only the lower detector signal S2 is present to calculate a distribution of the radiation signal S over the entire length of the fuel effective section 8 in the fuel assembly 1.

Thereafter, the relative burn-up BU is calculated from the radiation signal S, which is calculated in step ST52, by utilizing a relation between the radiation signal S and specific burn-up calculated in advance and a burn-up profile of the fuel assembly 1 is calculated (ST53).

Therefore, according to this embodiment, effects (3) and (4) described below are realized and an effect same as the effect (2) of the first embodiment is realized.

(3) Radiation signals in the same portion in the fuel effective section 8 of the fuel assembly 1 are slightly redundantly measured by the upper detector 2 and the lower detector 3, respectively. Soundness of the radiation signals measured by the upper detector 2 and the lower detector 3 is determined in every measurement by comparing ratios of the radiation signals in this redundant portion with, for example, ratios of radiation signals obtained in the last measurement. Thereafter, a radiation signal distribution over the entire length in the axial direction in the fuel effective section 8 of the fuel assembly 1 is calculated by superimposing, on the radiation signals (the upper detector signal and the lower detector signal) measured by the upper detectors 2 and the lower detectors 3, radiation signals in the portion where the radiation signals are redundantly measured to combine the radiation signals. Since the soundness of the radiation signals measured by the upper detector 2 and the lower detector 3 is determined in every measurement, it is possible to measure a burn-up profile of the fuel assembly 1 while securing reliability of a measurement result.

(4) Since distributions of radiation signals are measured by the upper detector 2 and the lower detector 3 while the fuel assembly 1 and the upper detector 2 and the lower detector 3 are relatively moved along the axial direction of the fuel assembly 1 by a distance longer than the distance about the half of the fuel effective section 8, the moving distance is reduced and measurement time for the radiation signals can be reduced. Therefore, it is possible to efficiently measure a burn-up profile of the fuel assembly 1.

Figures 10A, 10B:
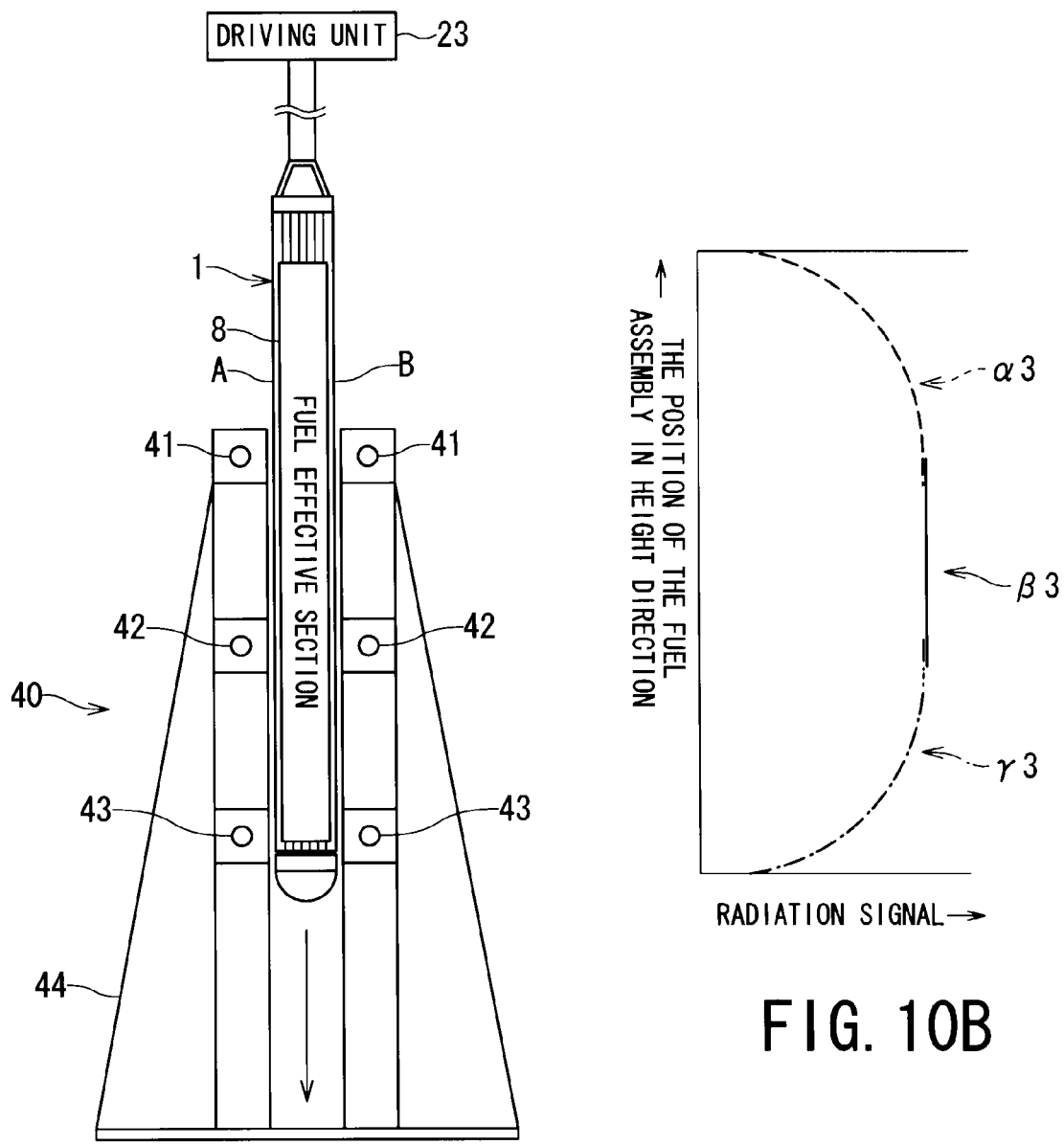
FIG. 10A is a side view illustrating, together with a fuel assembly, a detecting device used in a fourth embodiment of the burn-up profile measuring method according to the present invention
FIG. 10B is a graph illustrating signals measured by the detectors illustrated in FIG. 10A.
Figure 11A:
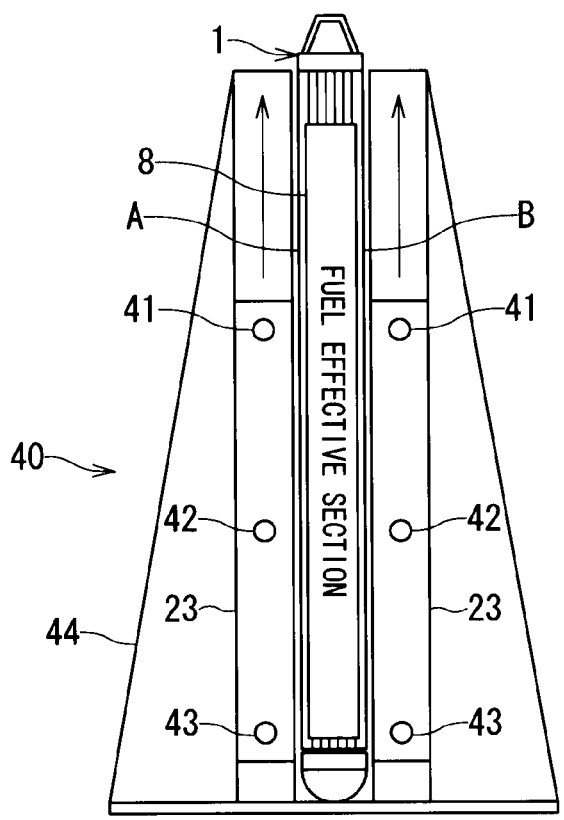
FIG. 11A is a side view illustrating, together with a fuel assembly, another aspect of the detecting device illustrated in FIG. 10A
Figure 11B:
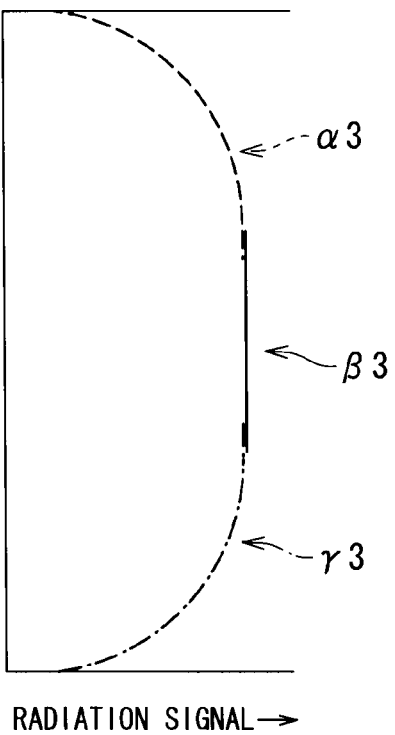
FIG. 11B is a graph illustrating signals measured by detectors illustrated in FIG. 11A.

[D] Fourth Embodiment (FIGS. 10 and 11)

In FIG. 10, i.e., FIGS. 10A and 10B, FIG. 10A is a side view illustrating, together with a fuel assembly, a detecting device used in a fourth embodiment of the burn-up profile measuring method according to the present invention and FIG. 10B is a graph illustrating signals measured by the detectors illustrated in FIG. 10A. In this fourth embodiment, components same as those in the first and third embodiments are denoted by the same reference numerals and signs and explanation of the components is simplified or omitted.

The burn-up profile measuring method according to this embodiment is different from the third embodiment in that three to six detectors, for example, three detectors arranged at equal intervals along the axial direction of the fuel assembly 1 are used and distributions of radiation signals are measured while these detectors and the fuel assembly 1 are relatively moved along the axial direction of the fuel assembly 1 by a distance slightly longer than an arrangement interval of the detectors.

Specifically, in the burn-up profile measuring method in this embodiment, first, upper detectors 41, intermediate detectors 42, and lower detectors 43 are arranged along the axial direction of the fuel assembly 1 to respectively face the opposed sides A and B of the fuel assembly 1 on which neutrons are irradiated in the nuclear reactor.

The upper detectors 41, the intermediate detectors 42, and the lower detectors 43 are arranged along the axial direction of the fuel assembly 1 spaced apart by a distance about one third of the length of the fuel effective section 8 of the fuel assembly 1, preferably, spaced apart by a distance slightly shorter than one third of the length of the fuel effective section 8. Specifically, in a detector holding unit 44 of a detecting device 40, the upper detectors 41 are set in an upper part thereof, the intermediate detectors 42 are arranged below the upper detectors 41 by a distance about one third of the length of the fuel effective section 8 (preferably, a distance slightly shorter than one third of the length of the fuel effective section 8). The lower detectors 43 are arranged below the intermediate detectors 42 by a distance about one third of the length of the fuel effective section 8 (preferably, a distance slightly shorter than one third of the length of the fuel effective section 8).

Next, in a state in which the lower detectors 43 are located at the lower end of the fuel effective section 8 of the fuel assembly 1, distributions of radiation signals are measured by the upper detectors 41, the intermediate detectors 42, and the lower detectors 43 while the fuel assembly 1 is moved downward along the axial direction by the distance slightly longer than about the one third of the length of the fuel effective section 8. When the distributions are measured, a radiation signal distribution in a range of about one third in the upper part of the fuel effective section 8 of the fuel assembly 1 is measured by the upper detectors 41, a radiation signal distribution in a range of about one third in the vertical center of the fuel effective section 8 is measured by the intermediate detectors 42, and a radiation signal distribution in a range of about one third in the lower part of the fuel effective section 8 is measured by the lower detectors 43.

Further, the same portion is redundantly measured by the upper detectors 41 and the intermediate detectors 42 near about one third from the top of the fuel effective section 8 in the fuel assembly 1. The same portion is redundantly measured by the intermediate detectors 42 and the lower detectors 43 near about one third from the bottom of the fuel effective section 8 of the fuel assembly 1.

Instead of moving the fuel assembly 1 downward relatively to the upper detectors 41, the intermediate detectors 42, and the lower detectors 43 fixedly arranged in the detector holding unit 44, as illustrated in FIG. 11A, the upper detectors 41, the intermediate detectors 42, and the lower detectors 43 may be moved upward relatively to the fuel assembly 1. Specifically, in a state in which a spaced apart distance of the upper detectors 41, the intermediate detectors 42, and the lower detectors 43 is maintained at a distance about one third of the fuel effective section 8, the upper detectors 41, the intermediate detectors 42, and the lower detectors 43 are slid upward relatively to the detector holding unit 44 along the axial direction of the fuel assembly 1. It is also possible that a radiation signal distribution in the range of about one third in the upper part of the fuel effective section 8 is measured by the upper detectors 41, a radiation signal distribution in the range of about one third in the vertical center of the fuel effective section is measured by the intermediate detectors 42, and a radiation signal distribution in the range of about one third in the lower part of the fuel effective section 8 is measured by the lower detectors 43, while the upper detectors 41, the intermediate detectors 42, and the lower detectors 43 are moved (slid) relatively to the fuel assembly 1 by a distance slightly longer than about one third of the fuel effective section 8.

Next, soundness of the radiation signals measured by the upper detectors 41, the intermediate detectors 42, and the lower detectors 43 is determined. Specifically, ratios of the radiation signals are calculated concerning the portion where the upper detectors 41 and the intermediate detectors 42 redundantly measure radiation signal distributions. An average, a maximum, and a minimum of these ratios are compared with reference values including an average of ratios of radiation signals obtained in the same manner in the last measurement. Similarly, ratios of the radiation signals are calculated concerning the portion where the intermediate detectors 42 and the lower detectors 43 redundantly measure radiation signal distributions. An average, a maximum, and a minimum of these ratios are compared with reference values including an average of ratios of radiation signals obtained in the same manner in the last measurement. According to these comparisons, soundness of the radiation signals measured by the upper detectors 41, the intermediate detectors 42, and the lower detectors 43 is determined.

In FIG. 10B, the radiation signal distribution measured by the upper detectors 41 is indicated by a broken line α3, the radiation signal distribution measured by the intermediate detectors 42 is indicated by a solid line β3, and the radiation signal distribution measured by the lower detectors 43 is indicated by an alternate long and short dash line γ3. Intensity of measurement signals obtained when the same portion of the fuel effective section 8 in the fuel assembly 1 is redundantly measured by the two detectors is substantially the same regardless of which fuel assembly 1 is measured, although there is a difference depending on sensitivity of the detectors. Therefore, by comparing the ratios of the radiation signals in the portion redundantly measured by the upper detectors 41 and the intermediate detectors 42 with ratios of radiation signals obtained in the same manner in the last measurement and comparing the ratios of the radiation signals in the portion redundantly measured by the intermediate detectors 42 and the lower detectors 43 with ratios of radiation signals obtained in the same manner in the last measurement, it is possible to determine presence or absence of a failure and a change in sensitivity of the upper detectors 41, the intermediate detectors 42, and the lower detectors 43 in every measurement.

Thereafter, the radiation signals measured by the upper detectors 41, the intermediate detector 42, and the lower detectors 43, respectively, are corrected to the same sensitivity level. A radiation signal distribution over the entire length in the axial direction of the fuel assembly 1 is calculated by superimposing, on the radiation signals measured by the upper detectors 41, the intermediate detectors 42, and the lower detectors 43, radiation signals in the portion where the radiation signals are redundantly measured to combine the radiation signals. Relative burn-up is calculated from this radiation signal distribution over the entire length in the axial direction to measure a burn-up profile of the fuel assembly 1.

In this embodiment, since the number of detectors arranged at equal intervals in the axial direction of the fuel assembly 1 is only different from that in the third embodiment, effects same as the effects (2), (3), and (4) of the third embodiment are realized.

[E] Fifth Embodiment (FIGS. 12 to 15)

Figure 12A:
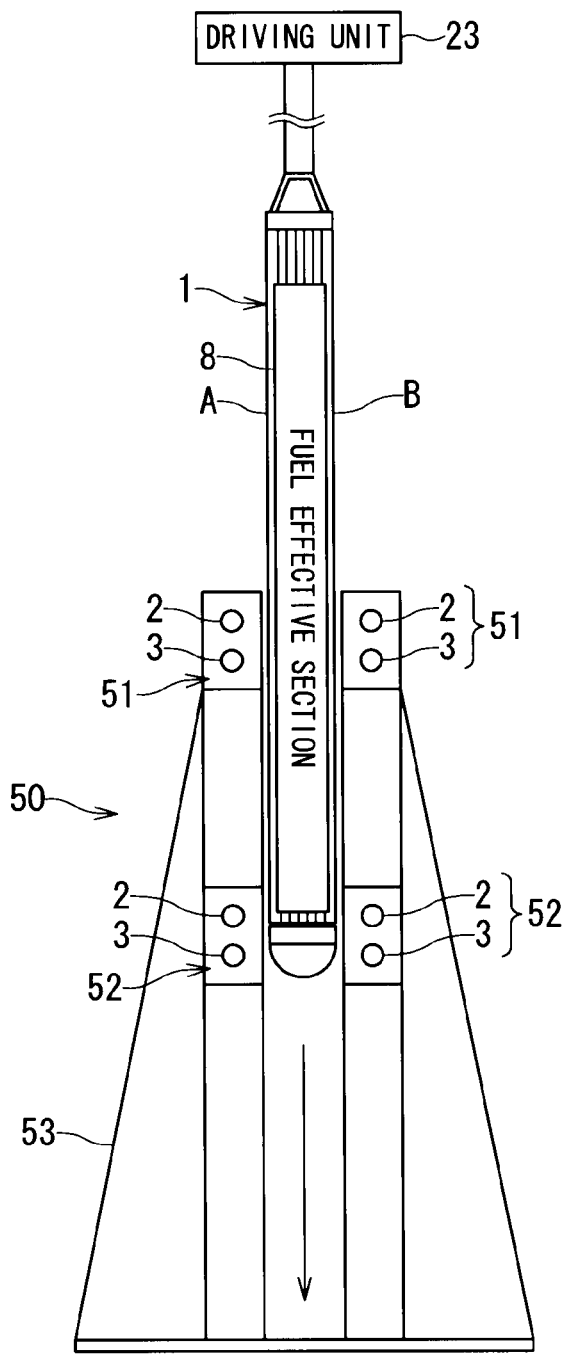
FIG. 12A is a side view illustrating, together with a fuel assembly, a detecting device used in a fifth embodiment of the burn-up profile measuring method according to the present invention
Figure 12B:
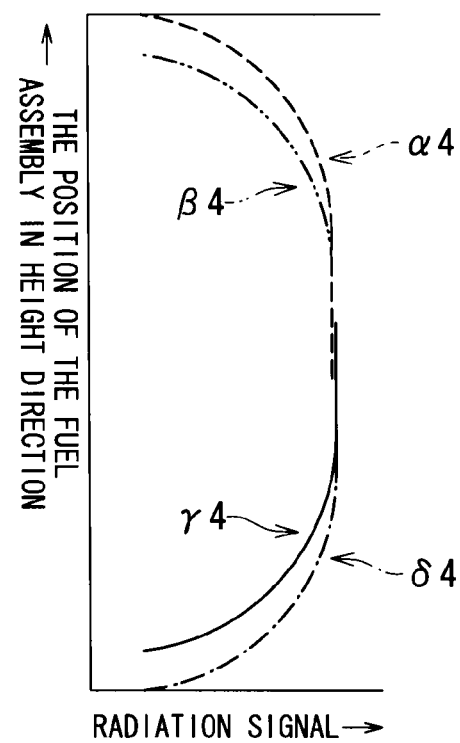
FIG. 12B is a graph illustrating signals measured by the detectors illustrated in FIG. 12A.

In FIG. 12, i.e., FIGS. 12A and 12B, FIG. 12A is a side view illustrating, together with a fuel assembly, a detecting device used in a fifth embodiment of the burn-up profile measuring method according to the present invention and FIG. 12B is a graph illustrating signals measured by the detectors illustrated in FIG. 12A. In this fifth embodiment, components same as those in the first and third embodiments are denoted by the same reference numerals and signs and explanation of the components is simplified or omitted.

In the burn-up profile measuring method in this embodiment, first, upper detector units 51 and lower detector units 52 are arranged along the axial direction of the fuel assembly 1 to respectively face the opposed sides A and B of the fuel assembly 1 on which neutrons are irradiated in the nuclear reactor. The upper detector units 51 and the lower detector units 52 are arranged along the axial direction of the fuel assembly 1 to be spaced apart by a distance about the half of the length of the fuel effective section 8 of the fuel assembly 1, preferably, spaced apart by a distance slightly shorter than the half of the length of the fuel effective section 8. In each of the upper detector units 51 and the lower detector units 52, the upper detector 2 and the lower detector 3 that detect radiation are arranged closer to each other at a distance in a range of 5 to 50 cm, which is relatively short compared with the length in the axial direction of the fuel assembly 1, along the axial direction of the fuel assembly 1.

Therefore, in a detector holding unit 53 of a detecting device 50, the upper detector units 51 in which the upper detectors and the lower detectors 3 are arranged vertically close to each other are arranged in an upper part thereof and the lower detector units 52 in which the upper detectors 2 and the lower detectors 3 are arranged vertically close to each other are arranged below the upper detector units 51 by the distance about the half of the length of the fuel effective section 8 (preferably the distance slightly shorter than the half of the length of the fuel effective section 8).

Next, in a state in which the upper detectors 2 of the lower detector units 52 are located at the lower end of the fuel effective section 8 of the fuel assembly 1, for example, concerning the side A of the fuel assembly 1, distributions of radiation signals are measured by the upper detectors 2 and the lower detectors 3 of the upper detector units 51 and the upper detectors 2 and the lower detectors 3 of the lower detector units 52 while the fuel assembly 1 is moved downward along the axial direction by the distance slightly longer than about the half of the length of the fuel effective section 8.

When the distributions are measured, the upper detectors and the lower detectors of the upper detector units 51 measure a radiation signal distribution in a multiplexed manner concerning a substantial upper half portion of the fuel effective section 8 in the fuel assembly 1. The upper detectors 2 and the lower detectors 3 of the lower detector units 52 measure a radiation signal distribution in a multiplexed manner concerning a substantial lower half portion of the fuel effective section 8. Further, the upper detectors 2 and the lower detectors 3 of each of the upper detector units 51 and the lower detector units 52 slightly redundantly measure a radiation signal distribution concerning a vertical substantial center portion of the fuel effective section 8.

Instead of moving the fuel assembly 1 downward relatively to the upper detector units 51 and the lower detector units 52, the fuel assembly 1 may be fixedly held and the upper detector units 51 and the lower detector units 52 may be moved upward along the axial direction of the fuel assembly 1 in a state in which a spaced apart distance of the upper detector units 51 and the lower detector units 52 is maintained at a distance about a half of the fuel effective section 8.

Next, soundness of the radiation signals respectively measured by the upper detectors 2 and the lower detectors 3 of the upper detector units 51 and the upper detectors 2 and the lower detectors 3 of the lower detector units 52 is determined. Specifically, ratios of the radiation signals measured in a multiplexed manner are calculated concerning the substantial upper half portion in the fuel effective section 8 of the fuel assembly 1 where the upper detectors 2 and the lower detectors 3 of the upper detector units 51 measure radiation signal distributions in a multiplexed manner. An average, a maximum, and a minimum of these ratios are compared with reference values including an average of ratios of radiation signals obtained in the same manner in the last measurement, i.e., the average of the ratios and a determination value determined in advance. According to this comparison, soundness of the radiation signals measured by the upper detectors 2 and the lower detectors 3 of the upper detector units 51 is determined.

Similarly, ratios of the radiation signals measured in a multiplexed manner are calculated concerning the substantial lower half portion in the fuel effective section 8 of the fuel assembly 1 where the upper detectors 2 and the lower detectors 3 of the lower detector units 52 measure radiation signal distributions in a multiplexed manner. An average, a maximum, and a minimum of these ratios are compared with reference values including an average of ratios of radiation signals obtained in the same manner in the last measurement, i.e., the average of the ratios and a determination value determined in advance. According to this comparison, soundness of the radiation signals measured by the upper detectors 2 and the lower detectors 3 of the lower detector units 52 is determined.

In FIG. 12B, the radiation signal distributions respectively measured by the upper detectors 2 and the lower detectors of the upper detector units 51 are indicated by a broken line $\alpha 4$ and an alternate long and two dashes line $\beta 4$, respectively, and the radiation signal distributions measured by the upper detectors 2 and the lower detectors 3 of the lower detector units 52 are indicated by a solid line $\gamma 4$ and an alternate long and short dash line $\delta 4$, respectively.

Distributions of radiation signals obtained by measuring the same portion of the fuel effective section 8 in the fuel assembly 1 in a multiplexed manner with the two detectors (the upper detector 2 and the lower detector 3) of each of the upper detector units 51 or the lower detector units 52 originally have the same shape, although absolute values of the signals may be different depending on a difference in sensitivities of the detectors. Therefore, by comparing, as described above, the radiation signals measured in a multiplexed manner by the upper detectors 2 and the lower detectors 3 of the upper detector units 51, it is possible to determine presence or absence of a failure or a change in sensitivity of the upper detectors 2 and the lower detectors 3 of the upper detector units 51 or unexpected abnormality due to noise or the like. The same holds true for the radiation signals measured in a multiplexed manner by the upper detectors 2 and the lower detectors 3 of the lower detector units 52. Therefore, by comparing these radiation signals, it is possible to determine presence or absence of a failure, a change in sensitivity, and the like of the upper detectors 2 and the lower detectors 3 of the lower detector units 52.

Thereafter, an average of the radiation signals measured by the upper detectors 2 and the lower detectors 3 of the upper detector units 51 and an average of the radiation signals measured by the upper detectors 2 and the lower detectors 3 of the lower detector units 52 are corrected to the same sensitivity level. The averages of these radiation signals are combined by superimposing an average of radiation signals in the portion redundantly measured by the upper detector units 51 and the lower detector units 52 on the averages to calculate a radiation signal distribution over the entire length in the axial direction of the fuel assembly 1. Relative burn-up is calculated from this radiation signal distribution over the entire length in the axial direction to measure a burn-up profile.

Figure 13:
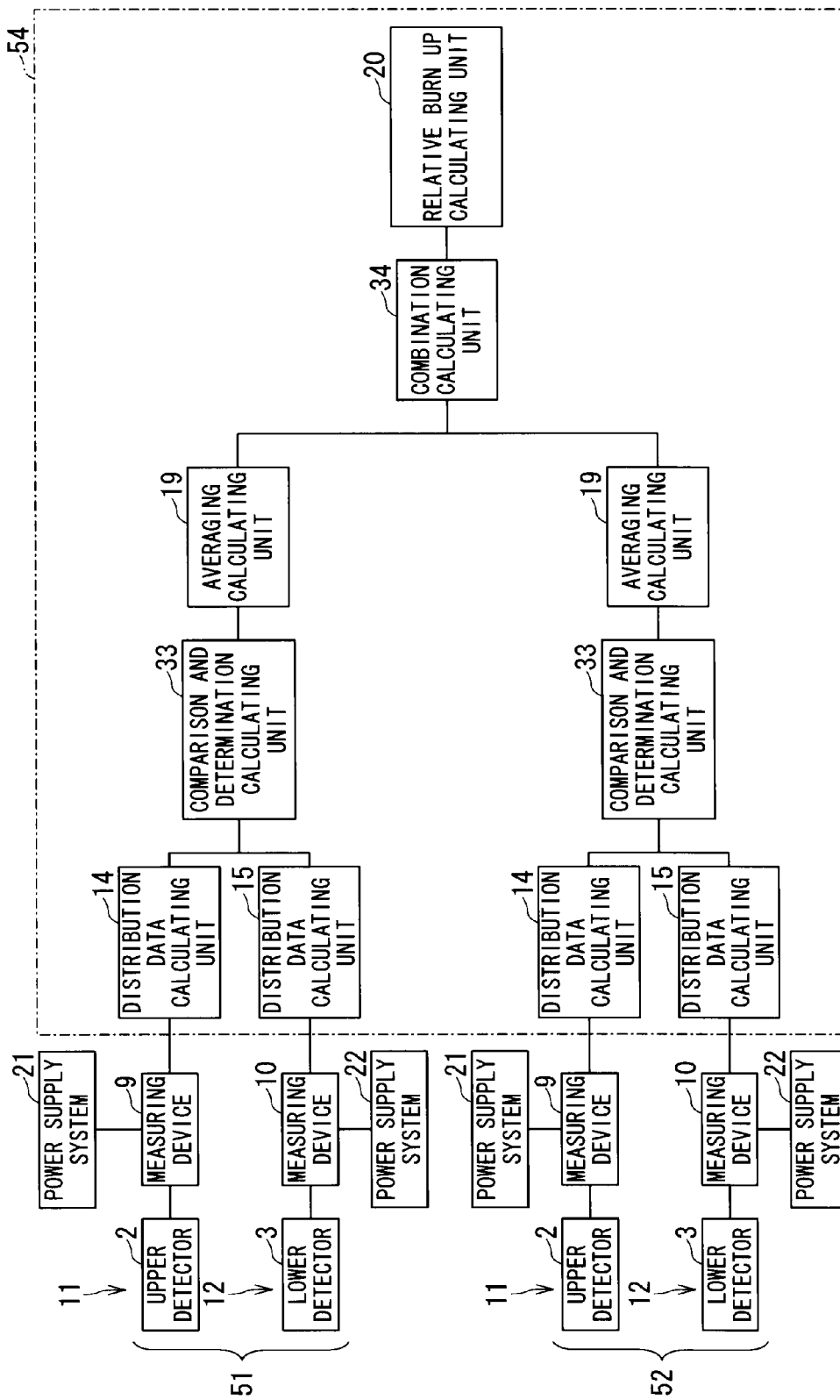
FIG. 13 is a block diagram illustrating a measuring system including the detectors illustrated in FIG. 12A and a signal processing device.

The measurement of the burn-up profile described above is mainly carried out by a signal processing device 54 illustrated in FIG. 13. This signal processing device 54 has functional units substantially the same as those of the signal processing device 13 according to the first embodiment and the signal processing device 32 according to the third embodiment. The functional units are denoted by the same reference numerals. Among the functional units, the upper detectors 2, the lower detectors 3, the measuring devices 9 and 10, the distribution-data calculating units 14 and 15, the comparison and determination calculating units 33, and the averaging calculating units 19 are provided in association with the upper detector units 54 and the lower detector units 52, respectively. This signal processing device 54 is also a computer. Steps ST61 to ST86 (FIGS. 14 and 15) described later for driving this signal processing device 54 are stored in a not-illustrated storage device as a computer program.

Figure 14:
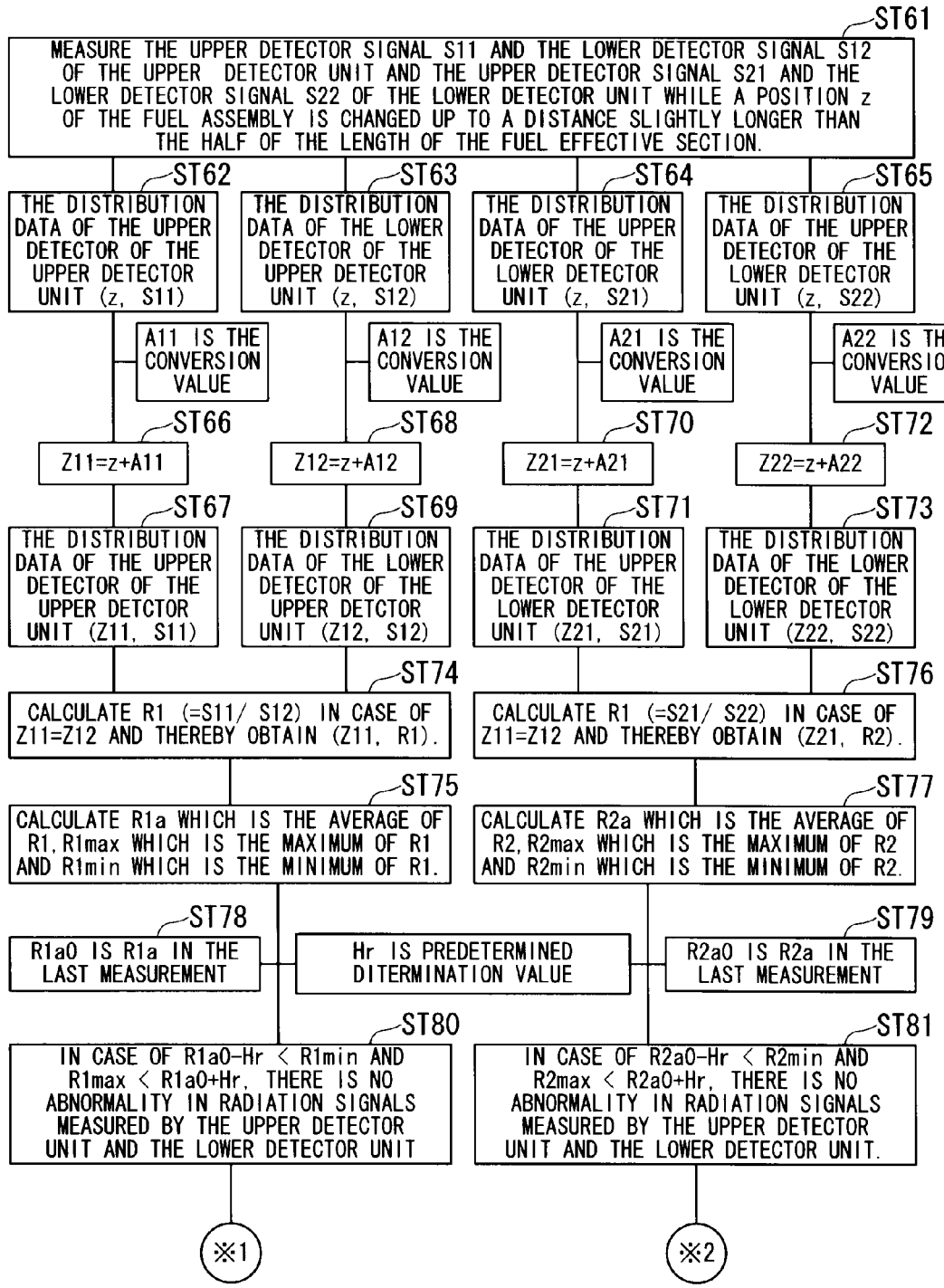
FIG. 14 is a former part of a flowchart showing a burn-up profile measuring method executed by the measuring system and the signal processing device, illustrated in FIG. 13.
Figure 15:
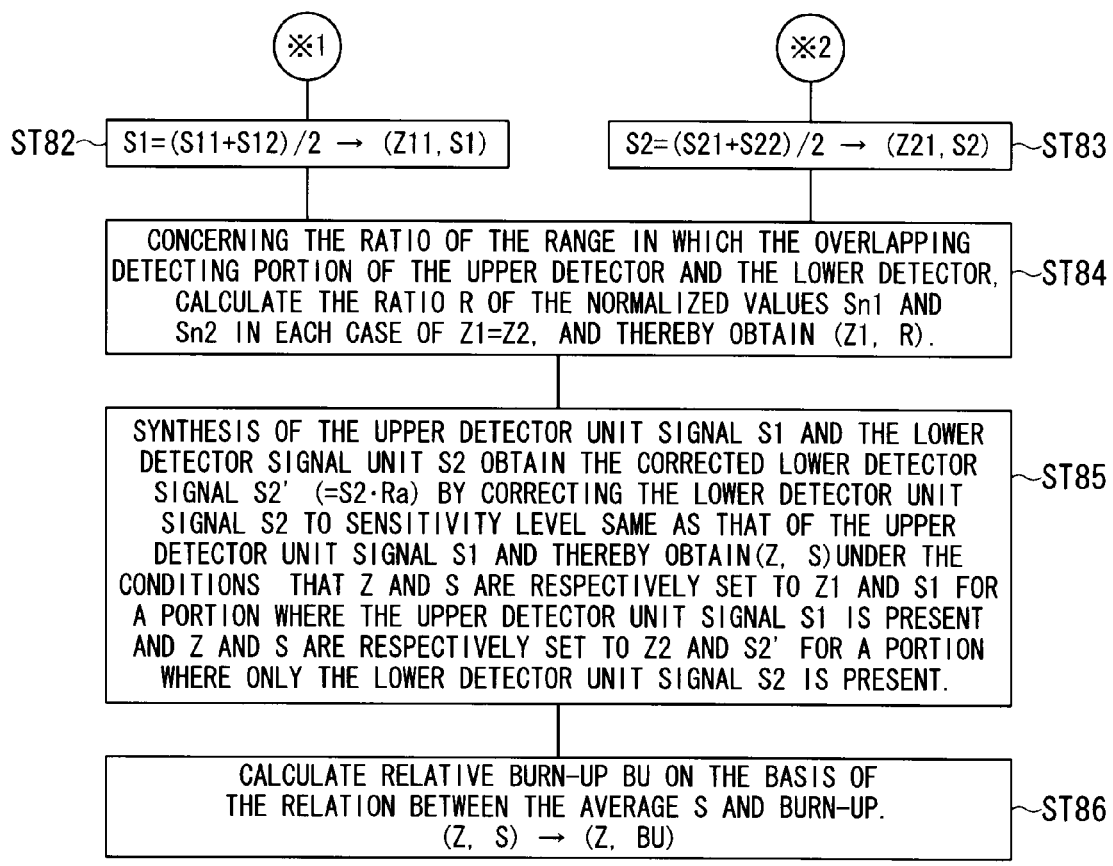
FIG. 15 is a latter part of a flowchart showing a burn-up profile measuring method executed by the measuring system and the signal processing device, illustrated in FIG. 13.

A correspondence relation between the signal processing device 54 and the measuring devices 9 and 10 and steps illustrated in FIGS. 14 and 15 executed by the signal processing device 54 and the measuring devices 9 and 10 is described below. The measuring device 9 on the upper detector unit 51 side executes steps ST61 and ST62 and the measuring device 10 on the upper detector unit 51 side executes steps ST61 and ST63. The measuring device 9 on the lower detector unit 52 side executes steps ST61 and ST64 and the measuring device 10 on the lower detector unit 52 side executes steps ST61 and ST65. The distribution-data calculating unit 14 on the upper detector unit 51 side executes steps ST66 and ST67 and the distribution-data calculating unit 15 on the upper detector unit 51 side executes steps ST68 and ST69. The distribution-data calculating unit 14 on the lower detector unit 52 side executes steps ST70 and ST71 and the distribution-data calculating unit 15 on the lower detector unit 52 side executes steps ST72 and ST73.

The comparison and determination calculating unit 33 on the upper detector unit 51 side executes steps ST74, ST75, ST78, and ST80 and the comparison and determination calculating unit 33 on the lower detector unit 52 side executes steps ST76, ST77, ST79, and ST81. The averaging calculating unit 19 on the upper detector unit 51 side executes step ST82 and the averaging calculating unit 19 on the lower detector unit 52 side executes procedure ST83. The combination calculating unit 34 executes steps ST84 and ST85 and the relative-specific-burn-up calculating unit 20 executes step ST86.

A procedure of burn-up profile measurement executed by the signal processing device 54 and the like described above is explained below with reference to FIGS. 14 and 15.

Two sets of detector units (the upper detector unit 51 and the lower detector unit 52) in which the upper detectors 2 and the lower detectors 3 are vertically arranged at a relatively short distance of about 5 to 50 cm to face, for example, the side A of the fuel assembly 1 are vertically arranged spaced apart by a distance of about the half of the length of the fuel effective section 8 of the fuel assembly 1.

First, the fuel assembly 1 is set in a position where the upper detector 2 of the lower detector unit 52 is at the lower end of the fuel effective section 8 and the upper detector unit 51 is substantially in the center of the fuel effective section 8. A radiation signal distribution is measured concerning, for example, the side A of the fuel assembly 1 while the fuel assembly 1 is moved in the downward direction along the upper detector unit 51 and the lower detector unit 52 by a distance slightly longer than the half of the length of the fuel effective section 8 or the upper detector unit 51 and the lower detector unit 52 are moved in the upward direction along the fuel assembly 1 by a distance slightly longer than the half of the length of the fuel effective section 8 (ST61).

When the radiation signal distribution is measured, an upper detector signal S11 in the position z of the fuel assembly 1 is measured by utilizing the upper detector 2 and the measuring device 9 of the upper detector unit 51 (ST62). A lower detector signal S12 in the position z of the fuel assembly 1 is measured by utilizing the lower detector 3 and the measuring device 10 of the upper detector unit 51 (ST63). Further, an upper detector signal S21 in the position z of the fuel assembly 1 is measured by utilizing the upper detector 2 and the measuring device 9 of the lower detector unit 52 (ST64). A lower detector signal S22 in the position z of the fuel assembly 1 is measured by utilizing the lower detector 3 and the measuring device 10 of the lower detector unit 52 (ST65).

A value A11 for converting the position z of the fuel assembly 1 into a position of the upper detector 2 of the upper detector unit 51 is added to this position z to calculate a measurement position Z11 of the upper detector 2 of the upper detector unit 51 relative to the fuel assembly 1 (ST66 and 67). A value A12 for converting the position z of the fuel assembly 1 into a position of the lower detector 3 of the upper detector unit 51 is added to this position z to calculate a measurement position Z12 of the lower detector 3 of the upper detector unit 51 relative to the fuel assembly 1 (ST68 and 69).

A value A21 for converting the position z of the fuel assembly 1 into a position of the upper detector 2 of the lower detector unit 52 is added to this position z to calculate a measurement position Z21 of the upper detector 2 of the lower detector unit 52 relative to the fuel assembly 1 (ST70 and 71). A value A22 for converting the position z of the fuel assembly 1 into a position of the lower detector 3 of the lower detector unit 52 is added to this position z to calculate a measurement position Z22 of the lower detector 3 of the lower detector unit 52 relative to the fuel assembly 1 (ST72 and 73).

Concerning a portion measured in a multiplexed manner by the upper detector 2 and the lower detector 3 of the upper detector unit 51, i.e., a range in which a portion of Z11=Z12 is present, ratios R1 of the upper detector signal S11 and the lower detector signal S12 at the time of Z11=Z12 are calculated (ST74). An average R1$a$, a maximum R1max, and a minimum R1min of these ratios R1 are calculated (ST75).

Further, concerning a portion measured in a multiplexed manner by the upper detector 2 and the lower detector 3 of the lower detector unit 52, i.e., a range in which a portion of Z21=Z22 is present, ratios R2 of the upper detector signal S21 and the lower detector signal S22 at the time of Z21=Z22 are calculated (ST76). An average R2$a$, a maximum R2max, and a minimum R2min of these ratios R2 are calculated (ST77).

The average R1$a$ of ratios obtained in the last measurement by the same method is represented as R1$a$0 (ST78) and the average R2$a$ of the ratios is represented as R2$a$0 (ST79). When the minimum R1min is larger than a value obtained by subtracting the determination value Hr determined in advance from the average R1$a$0 of the ratios of the last time and the maximum R1max is smaller than a value obtained by adding the determination value Hr determined in advance to the average R1$a$0 of the ratios of the last time, it is determined that there is no abnormality in radiation signals measured by the upper detector 2 and the lower detector 3 of the upper detector unit 51 (ST80).

Further, when the minimum R2min is larger than a value obtained by subtracting the determination value Hr determined in advance from the average R2$a$0 of the ratios of the last time and the maximum R2max is smaller than a value obtained by adding the determination value Hr determined in advance to the average R2$a$0 of the ratios of the last time, it is determined that there is no abnormality in radiation signals measured by the upper detector 2 and the lower detector 3 of the lower detector unit 52 (ST81).

The upper detector 2 and the lower detector 3 of the upper detector unit 51 measure the same position in a multiplexed manner concerning a substantial upper half portion of the fuel effective section 8 of the fuel assembly 1. Similarly, the upper detector 2 and the lower detector 3 of the lower detector unit 52 measure the same position in a multiplexed manner concerning a substantial lower half portion of the fuel effective section 8 of the fuel assembly 1.

When the measurement is normally performed, the average R1$a$ of the ratios R1 of the upper detector signal S11 and the lower detector signal S12 of the upper detector unit 51 is equivalent to a sensitivity ratio of the upper detector 2 and the lower detector 3 of the upper detector unit 51. The average R2$a$ of the ratios R2 of the upper detector signal S21 and the lower detector signal S22 of the lower detector unit 52 is equivalent to a sensitivity ratio of the upper detector 2 and the lower detector 3 of the lower detector unit 52. If a failure, a change in sensitivity, or unexpected signal abnormality such as noise occurs in the upper detector 2 or the lower detector 3, a maximum or a minimum of the average R1$a$ of the ratios R1 or the average R2$a$ of the ratios R2 exceeds a determination value. Therefore, it is possible to detect the abnormality.

Next, an average of the upper detector signal S11 and the lower detector signal S12 at the time when the upper detector 2 and the lower detector 3 of the upper detector unit 51 measure the same position, i.e., at the time of Z11=Z12 is represented as 51 (ST82). An average of the upper detector signal S21 and the lower detector signal S22 at the time when the upper detector 2 and the lower detector 3 of the lower detector unit 52 measure the same position, i.e., at the time of Z21=Z22 is represented as S2 (ST83).

Ratios R of the average S1 on the upper detector unit 51 side and the average S2 on the lower detector unit 52 side in a range in which a redundant measurement portion of the upper detector unit 51 and the lower detector unit 52, i.e., a portion of Z11=Z21 is present are calculated and an average of the ratios R is represented as Ra (ST84).

A corrected average S2' on the lower detector unit 52 side obtained by correcting the average S2 on the lower detector unit 52 side to a sensitivity level same as that of the average S1 on the upper detector unit 51 side is calculated by multiplying the average S2 on the lower detector unit 52 side with the average Ra of the ratios R. S is set to S1 for a portion where a detector signal of the upper detector unit 51 is present and S is set to S2' for a portion where only a detector signal of the lower detector unit 52 is present to calculate a distribution of the radiation signal S over the entire length of the fuel effective section 8 in the fuel assembly 1 (ST85).

Thereafter, the relative burn-up BU is calculated from the radiation signal S, which is calculated in step ST85, by utilizing a relation between the radiation signal S and specific burn-up calculated in advance and a burn-up profile of the fuel assembly 1 is calculated (ST86).

Therefore, according to this embodiment, effects (5) and (6) described below are realized and an effect same as the effect (2) of the first embodiment is realized.

(5) Radiation signal distributions measured in a multiplexed manner by the upper detectors 2 and the lower detectors 3 of the upper detector units 51 are compared. Radiation signals measured in a multiplexed manner by the upper detectors 2 and the lower detectors 3 of the lower detector units 52 are compared. Soundness of the radiation signals respectively measured by the upper detectors 2 and the lower detectors 3 of the upper detector units 51 and the upper detectors 2 and the lower detectors 3 of the lower detector units 52 is determined in every measurement. Thereafter, an average of the radiation signals measured by the upper detectors 2 and the lower detectors 3 of the upper detector units 51 and an average of the radiation signals measured by the upper detectors 2 and the lower detectors 3 of the lower detector units 52 are combined by superimposing an average of radiation signals of a portion redundantly measured by the upper detector units 51 and the lower detector units 52 on the averages to calculate a radiation signal distribution over the entire length in the axial direction of the fuel assembly 1. In this way, soundness of the radiation signals measured by the upper detectors 2 and the lower detectors 3 of each of the upper detector units 51 and the lower detector units 52 is determined in every measurement. Therefore, it is possible to measure a burn-up profile of the fuel assembly 1 while securing reliability of a measurement result.

Distributions of radiation signals are measured by the upper detectors 2 and the lower detectors 3 of the upper detector units 51 and the lower detector units 52 while the fuel assembly 1 and the upper detector units 51 and the lower detector units 52 are relatively moved along the axial direction of the fuel assembly 1 by a distance slightly longer than an interval of the upper detector units 51 and the lower detector units 52. Therefore, since the moving distance is reduced and measurement time for the radiation signals can be reduced, it is possible to efficiently measure a burn-up profile of the fuel assembly 1.

In this fifth embodiment, detector units are not limited to the upper detector units 51 and the lower detector units 52. Three or more detector units may be set along the axial direction of the fuel assembly 1.

Industrial Applicability

According to the present invention, it is possible to effectively measure a burn-up profile of a fuel assembly while securing reliability of a measurement result.

The invention claimed is:

1. A burn-up profile measuring method comprising:
    setting plural detectors, which detect radiation, in an axial direction of a fuel assembly at a predetermined interval to face at least one side of the fuel assembly on which neutrons are irradiated in a nuclear reactor;
    measuring distributions of radiation signals with the detectors while relatively moving the fuel assembly and the detectors along the axial direction of the fuel assembly;
    determining, in every measurement, soundness of radiation signals measured by the detectors by comparing radiation signal distributions obtained by measuring a same portion in the axial direction of the fuel assembly in a multiplexed manner with these plural detectors; and
    measuring a burn-up profile by calculating relative burn-up based on the measured radiation signals after the measured radiation signals soundness determination step.

2. The burn-up profile measuring method according to claim 1, wherein the determination of soundness of radiation signals measured by the detectors is carried out by normalizing radiation signals measured by the detectors in a multiplexed manner and comparing a maximum of differences among normalized values of these radiation signals with a determination value.

3. The burn-up profile measuring method according to claim 1, wherein the determination of soundness of radiation signals measured by the detectors is carried out by normalizing radiation signals measured by the detectors in a multiplexed manner and comparing a maximum and a minimum of ratios of normalized values of these radiation signals with respective determination values.

4. The burn-up profile measuring method according to any one of claims 1 to 3, wherein the detectors are two detectors arranged close to each other at a distance in a range of 5 to 50 cm, which is relatively short compared with length in the axial direction of the fuel assembly.

5. A burn-up profile measuring method comprising:
setting plural detectors, which detect radiation, along an axial direction of a fuel assembly at an interval substantially equal to a distance obtained by dividing length of a fuel effective section of the fuel assembly by a number of the detectors to face at least one side of the fuel assembly on which neutrons are irradiated in a nuclear reactor;
arranging, at a lower end of the fuel effective section, the detector in a bottom position and measuring distributions of radiation signals with the detectors while relatively moving the fuel assembly and the detectors along the axial direction of the fuel assembly in a distance longer than the detector interval;
partially redundantly measuring a same portion of the fuel assembly with the detectors adjacent to each other in the axial direction of the fuel assembly and determining, in every measurement, soundness of radiation signals measured by the detectors by comparing a relation of radiation signals in the redundant portion with a reference value including a measurement result of a last time;
calculating a radiation signal distribution over entire length in the axial direction of the fuel assembly by superimposing, on radiation signals measured by the plural detectors, of which the soundness are determined, radiation signals in a portion where the radiation signals are redundantly measured to combine the radiation signals; and
measuring a burn-up profile by calculating relative burn-up based on the radiation signal distribution over the entire length in the axial direction.

6. The burn-up profile measuring method according to claim 5, wherein the determination of soundness of radiation signals measured by the detectors is carried out by calculating ratios of radiation signals concerning a portion redundantly measured by the detectors and comparing an average, a maximum, and a minimum of these ratios with reference values including an average of ratios of radiation signals obtained in a same manner in last measurement, and wherein the calculation of a radiation signal distribution over the entire length in the axial direction of the fuel assembly is carried out by, after correcting the radiation signals by the detectors to a same sensitivity level, combining these radiation signals.

7. The burn-up profile measuring method according to claim 5, wherein the detectors are two detectors arranged spaced apart by a distance substantially a half of the length of the fuel effective section in the fuel assembly, and distributions of radiation signals are measured while the fuel assembly and the detectors are relatively moved along the axial direction of the fuel assembly in a distance substantially longer than the half of the length of the fuel effective section.

8. The burn-up profile measuring method according to claim 5, wherein the detectors are three to six detectors arranged at an equal interval in the axial direction of the fuel assembly, and distributions of radiation signals are measured while the fuel assembly and the detectors are relatively moved along the axial direction of the fuel assembly in a distance longer than the arrangement interval of the detectors.

9. A burn-up profile measuring method comprising:
setting plural detector units along an axial direction of the fuel assembly at an interval substantially equal to a distance obtained by dividing length of a fuel effective section of the fuel assembly by a number of the detector units to face at least one side of a fuel assembly on which neutrons are irradiated in a nuclear reactor, the detector units including plural detectors that are set at a predetermined interval in the axial direction of the fuel assembly and detect radiation;
arranging, at a lower end of the fuel effective section, the detector in a top position in the detector unit in a bottom position and measuring distributions of radiation signals with the detectors of the detector units while relatively moving the fuel assembly and the detector units along the axial direction of the fuel assembly in a distance longer than the interval of the detector units;
partially redundantly measuring a same portion of the fuel assembly with the detector units adjacent to each other in the axial direction of the fuel assembly and measuring a same portion in the axial direction of the fuel assembly in a multiplexed manner with the plural detectors in the detector units;
determining, in every measurement, soundness of radiation signals measured by the detectors of the detector units by comparing radiation signal distributions measured in a multiplexed manner by the plural detectors in the detector units;
calculating a radiation signal distribution over entire length in the axial direction of the fuel assembly by superimposing, on radiation signals measured by the plural detectors of the plural detector units, of which the soundness are determined, radiation signals in a portion redundantly measured by the detector units adjacent to each other in the axial direction of the fuel assembly to combine the radiation signals; and
measuring a burn-up profile by calculating relative burn-up based on the radiation signal distribution over the entire length in the axial direction.

10. The burn-up profile measuring method according to claim 9, wherein the determination of soundness of radiation signals measured by the detectors of the detector units is carried out by calculating ratios of radiation signals measured in a multiplexed manner by the plural detectors of the detector units and comparing an average, a maximum, and a minimum of these ratios with reference values including an average of ratios of radiation signals obtained in a same manner in last measurement, and wherein the calculation of a radiation signal distribution over the entire length in the axial direction of the fuel assembly is carried out by correcting averages of radiation signals measured by the respective detectors of the detector units to a same sensitivity level and combining the average values.

11. The burn-up profile measuring method according to claim 9 or 10,
wherein the detector units are an upper detector unit and a lower detector unit arranged spaced apart by a distance substantially a half of the length of the fuel effective section in the fuel assembly, each of the detector units including two detectors arranged close to each other at a distance in a range of 5 to 50 cm, which is relatively short compared with the length in the axial direction of the fuel assembly,
wherein the detectors of the upper detector units and the detectors of the lower detector unit respectively measure a radiation signal distribution in a multiplexed manner concerning an upper half portion of the fuel effective section in the fuel assembly and concerning a lower half portion of the fuel effective section in the fuel assembly, and
wherein the each detectors of the upper detector unit and the lower detector unit measure a radiation signal distribution in a multiplexed manner concerning a center portion of the fuel effective section in the fuel assembly.

12. The burn-up profile measuring method according to any one of claims 1-3 and 5-10, wherein the detectors are ionization chambers that measure a gamma ray as a gamma ray energy gross amount without discriminating the gamma ray by energy, a relational expression between radiation signals detected by the detectors and specific burn-up is calculated in advance, and relative burn-up is calculated from the radiation signals by utilizing the relational expression.

13. A non-transitory computer-readable medium storing computer executable instructions for causing a computer to execute burn-up profile measurement processing operations for a fuel assembly, and at a time of setting plural detectors, which detect radiation, in an axial direction of the fuel assembly at a predetermined interval to face at least one side of a fuel assembly on which neutrons are irradiated in a nuclear reactor and measuring a burn-up profile utilizing distributions of radiation signals measured by the detectors while relatively moving the fuel assembly and the detectors along the axial direction of the fuel assembly, the burn-up profile measuring processing operations comprising:
- determining, in every measurement, soundness of radiation signals measured by the detectors by comparing radiation signal distributions obtained by measuring a same portion in the axial direction of the fuel assembly in a multiplexed manner with these plural detectors; and
- calculating relative burn-up utilizing the measured radiation signals to measure a burn-up profile after the determination step.

14. A non-transitory computer-readable medium storing computer executable instructions for causing a computer to execute burn-up profile measurement processing operations for a fuel assembly, and at a time of setting plural detectors, which detect radiation, along an axial direction of the fuel assembly at an interval substantially equal to a distance obtained by dividing length of a fuel effective section of the fuel assembly by a number of the detectors to face at least one side of a fuel assembly on which neutrons are irradiated in a nuclear reactor, arranging, at a lower end of the fuel effective section, the detector in a bottom position, and measuring a burn-up profile utilizing distributions of radiation signals measured by the detectors while relatively moving the fuel assembly and the detectors along the axial direction of the fuel assembly in a distance longer than the detector interval, the burn-up profile measuring processing operations comprising:
- determining, in every measurement, soundness of radiation signals measured by the detectors by comparing a relation of radiation signals in a redundant portion of the fuel assembly, which is partially redundantly measured by the detectors adjacent to each other in the axial direction of the fuel assembly, with a reference value including a measurement result of a last time;
- calculating a radiation signal distribution over entire length in the axial direction of the fuel assembly by superimposing, on radiation signals measured by the plural detectors, radiation signals in a portion where the radiation signals are redundantly measured to combine the radiation signals after the determination step; and
- measuring a burn-up profile by calculating relative burn-up from the radiation signal distribution over the entire length in the axial direction.

15. A non-transitory computer-readable medium storing computer executable instructions for causing a computer to execute burn-up profile measurement processing operations for a fuel assembly, and at a time of setting plural detector units along an axial direction of the fuel assembly at an interval substantially equal to a distance obtained by dividing length of a fuel effective section of the fuel assembly by a number of the detector units to face at least one side of a fuel assembly on which neutrons are irradiated in a nuclear reactor, the detector units including plural detectors that are set at a predetermined interval in the axial direction of the fuel assembly and detect radiation, measuring a burn-up profile utilizing distributions of radiation signals measured by the detectors of the detector units while relatively moving the fuel assembly and the detector units along the axial direction of the fuel assembly in a distance longer than the interval of the detector units when the detector in a top position in the detector unit in a bottom position are arranged at a lower end of the fuel effective section, the burn-up profile measuring processing operations comprising:
- determining, in every measurement, soundness of radiation signals measured by the detectors of the detector units by comparing radiation signal distributions measured in a multiplexed manner by the plural detectors in the detector units;
- calculating a radiation signal distribution over entire length in the axial direction of the fuel assembly, obtained by superimposing, on radiation signals measured by the plural detectors of the plural detector units, radiation signals in a portion redundantly measured by the detector units adjacent to each other in the axial direction of the fuel assembly by combining the radiation signals after the determining step; and
- measuring a burn-up profile by calculating relative burn-up from the radiation signal distribution over the entire length in the axial direction.

16. A radiation signal distribution measuring apparatus comprising:
- plural detectors which detect radiation;
- a detector holding unit configured to hold the detectors that face at least one side of a fuel assembly, on which neutrons are irradiated in a nuclear reactor, and are set at a predetermined interval in an axial direction of the fuel assembly;
- a driving unit configured to move at least one of the fuel assembly and the detectors along the axial direction of the fuel assembly;
- a radiation-signal-distribution acquiring unit configured to acquire a radiation signal distribution in the axial direction of the fuel assembly on the basis of radiation signals obtained by measuring a same portion in the axial direction of the fuel assembly in a multiplexed manner with the plural detectors;
- a determining unit configured to determine, in every measurement, soundness of radiation signals measured by the detectors on the basis of plural radiation signal distributions acquired by the radiation-signal-distribution acquiring unit; and
- an averaging calculating unit configured to obtain, when the determining unit determines that the radiation signals are sound, a radiation signal distribution in the axial direction of the fuel assembly on the basis of an average radiation signal value obtained by averaging plural radiation signal values measured concerning the same portion in the axial direction of the fuel assembly.

17. A burn-up profile measuring apparatus further comprising, in the radiation signal distribution measuring apparatus according to claim 16, a relative-specific-burn-up calculating unit configured to calculate relative burn-up on the basis of the radiation signal distribution measured by the radiation signal distribution measuring apparatus, and wherein the burn-up profile measuring apparatus is configured to output the relative burn-up, calculated by the relative-specific-burn-up calculating unit, as a relative burn-up measurement result.

* * * * *